US006860955B2

(12) United States Patent
Chapman

(10) Patent No.: US 6,860,955 B2
(45) Date of Patent: Mar. 1, 2005

(54) ENVELOPE OR OTHER ELONGATE ELEMENT PROCESSING

(75) Inventor: Carl R Chapman, Monroe, CT (US)

(73) Assignee: Pitney Bowes Ltd., Harlow Essex (GB)

( * ) Notice: Subject to any disclaimer, the term of this patent is extended or adjusted under 35 U.S.C. 154(b) by 435 days.

(21) Appl. No.: 10/016,880

(22) Filed: Dec. 14, 2001

(65) Prior Publication Data

US 2003/0111164 A1 Jun. 19, 2003

(51) Int. Cl.[7] .................................................. B32B 31/00

(52) U.S. Cl. ........................ 156/217; 156/362; 156/358; 156/360; 156/442.1; 156/442.2

(58) Field of Search ................................ 156/358, 360, 156/196, 441.5, 442.1, 442.2, 221, 217, 362, 363, 364; 53/460, 284.3, 473, 457

(56) References Cited

U.S. PATENT DOCUMENTS 3,683,757 A 8/1972 Lenk
4,119,482 A * 10/1978 Bennett ...................... 156/351
4,609,421 A * 9/1986 Yui ......................... 156/442.1
4,935,078 A * 6/1990 Bergman et al. .............. 156/64
5,375,722 A 12/1994 Leary et al.
5,415,068 A * 5/1995 Marzullo ..................... 53/492
5,511,357 A * 4/1996 Ricketts et al. ................ 53/55
5,816,994 A 10/1998 Hill et al.

FOREIGN PATENT DOCUMENTS

WO 94/22723 3/1994
WO 97/15439 9/1996
WO 99/14120 9/1998

* cited by examiner

*Primary Examiner*—Blaine Copenheaver
*Assistant Examiner*—Barbara J. Musser
(74) *Attorney, Agent, or Firm*—Christopher J. Capelli; Michael J. Cummings; Angelo N. Chaclas

(57) ABSTRACT

A process for performing a plurality of operations on an elongate element, in particular an envelope (60) in a folder-inserter machine, which operations, such as flapping (44, 47), inserting, moistening and sealing, are carried out at spaced-apart locations. The process enables various different lengths of envelope to be employed, without the need to adjust any of the mechanisms. This is achieved by feeding an envelope into the inserter unflapped and with its crease line trailing. A datum position for the crease line is determined following sensing (96), and all the distances the envelope needs to be moved for the various operations, which may in practice be closely associated with that crease line, measured from that datum position. Irrespective of the lengths of the envelopes processed, the drive means (43) moving them from one particular operation location to the next then needs to be operated for the same time.

6 Claims, 22 Drawing Sheets

ENVELOPE OR OTHER ELONGATE ELEMENT PROCESSING

Figure 1:
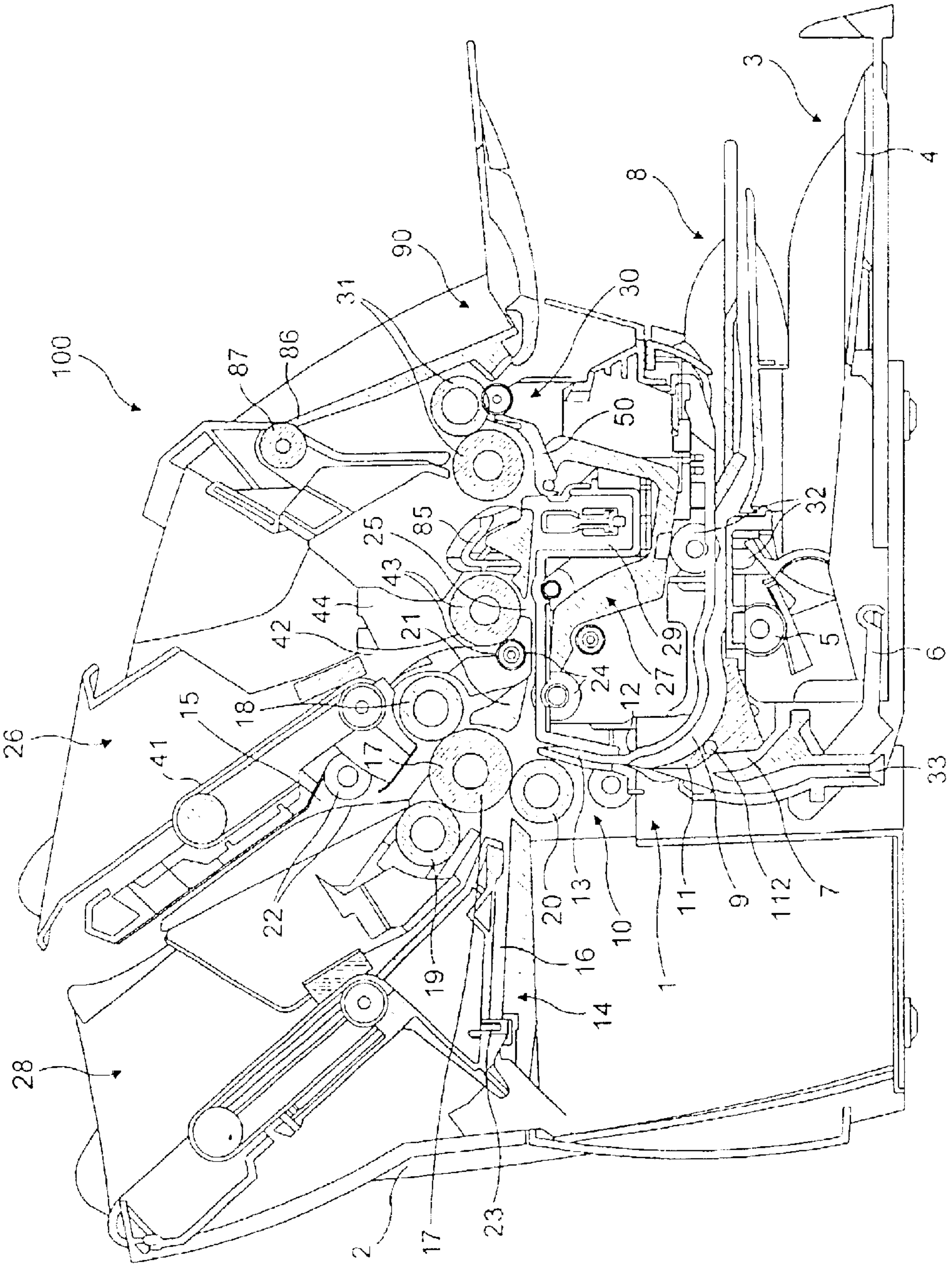

This invention relates to the processing of elongate elements or articles, and in particular to a process for the performance of a number of operations on an element, in particular an envelope, which operations are performed at respective locations which are spaced apart from one another.

In connection with a folder-inserter machine, for example, various operations on an envelope, such as flapping, inserting, moistening and sealing, are carried out at spaced apart locations within the machine. The envelope has to be driven between these locations and if different sizes (lengths) of envelopes are to be accommodated in one machine, conventionally the distances driven have to be adjusted to take into account the different envelope sizes. This is particularly disadvantageous for low volume throughput folder-inserters which are required to be relatively low cost for SOHO (small office/home office) applications, since the inherent complexity of adjusting for different envelope sizes puts up the cost.

It is an object of the present invention to provide a way of enabling different sizes of envelopes to be employed in a folder-inserter machine without requiring any adjustments to be made to the drive processes, although the invention is not restricted to processing envelopes and can in fact be applied to the processing of any other elongate members, or articles with leading and trailing edges, whose lengths may vary.

According to one aspect of the present invention, there is provided a method of processing a plurality of elements which have leading and trailing edges and may be of different lengths between said edges, including the step of driving the elements successively along a path to a predetermined position along the path at which an operation can be performed on the elements, wherein one of said edges of each said element is detected as it passes a datum point, which is a predetermined distance from said predetermined position, and wherein the one edge of each said element is driven the predetermined distance from the datum point to the predetermined position after the one edge is detected.

According to another aspect of the present invention, there is provided a process for performing a plurality of operations on an element having a leading and a trailing edge, which operations are performed at respective spaced apart locations, including the steps of (a) feeding a said element towards a first said location, (b) sensing the passage of the element towards the first said location, (c) sensing when the trailing edge of the element passes a datum point a predetermined distance from the first said location, (d) driving the element whereby its trailing edge is moved said predetermined distance to said first location after it is sensed, and performing the operation associated with the first location on the element, and (f) driving the element to a second said location at which its trailing edge is a respective predetermined distance from said datum point, and performing a respective operation at the second location, and wherein for movement of any element between the first and second locations, and irrespective of the length of the element, the trailing edges of said elements are driven the same distance.

According to a further aspect of the present invention there is provided a process for performing a plurality of operations on an elongate element, which operations are performed at respective spaced-apart locations, comprising the steps of: (a) feeding a said elongate element towards a first said location, (b) sensing the passage of the elongate element towards the first said location and stopping said elongate element when its trailing edge has been sensed, the stopped position of the trailing edge comprising a datum position therefor, (c) moving the elongate element by respective drive means such that the trailing edge is disposed at a second location and at a respective distance from the datum position and performing a respective operation on the elongate element, (d) moving the elongate element by respective drive means such that the trailing edge is disposed at a third location and at a respective distance from the datum position and performing a respective operation on the elongate element, and so on until the plurality of operations has been performed, and wherein for movement of any elongate element between two successive locations, and irrespective of the length of the elongate element, the respective drive means is actuated identically.

According to yet another aspect of the present invention there is provided a process for performing a plurality of operations on an envelope having a flap and a body with a crease line therebetween, which operations are performed at respective spaced-apart locations and are associated with the crease line, comprising the steps of (a) feeding the envelope unflapped, with the crease line trailing, towards a first said location, (b) sensing the passage of the envelope towards the first said location and stopping the envelope when the crease line has been sensed, the stopped position of the crease line comprising a datum position therefor, (c) moving the envelope by respective drive means such that the crease line is disposed at a second location and at a respective distance from the datum position and performing a respective operations on the envelope, (d) moving the envelope by respective drive means such that the crease line is disposed at a third location and at a respective distance from the datum position and performing a respective operation on the envelope, and so on until the plurality of operations has been performed, and wherein for movement of any envelope between two successive locations, and irrespective of the length of the elongate element, the respective drive means is actuated identically.

According to still another aspect of the present invention there is provided an article handling apparatus comprising a transport path, drive means for transporting an article having leading and trailing edges along said path, means for detecting when one of said edges of the article reaches a predetermined reference position on said path, means for performing an operation on said article when said one edge of the article arrives at an operating position on said path at a predetermined distance from said reference position, and control means, responsive to the edge detecting means detecting that said one edge of the article has reached said reference position, to cause the operation performing means to perform said operation on the article when the drive means has transported said one edge of the article by said predetermined distance from said reference position.

In the case of processing of envelopes, at one said location the respective operation may comprise flapping of the envelope, that is opening of the envelope flap, and the next operation may comprise inserting material into the envelope. By measuring all distances to the next operation location from the crease line, which is initially trailing, the distances the envelope needs to travel to the next location will be the same no matter what the length of the envelope. Hence no adjustment for different sizes of envelopes is required.

Another operation on an envelope may comprise moistening it, generally moistening its flap, for subsequent sealing, and in this case it is necessary to urge the envelope towards a moistening element at the appropriate time, in order to moisten gum on the envelope rather than other parts of the envelope. Thus it is required to perform this urging step at the required time and this can be consistently and reliably achieved when controlled in response to the crease line datum position.

Similarly, buckling of the envelope for subsequent sealing can be carried out when the crease line reaches a predetermined position, which will be the same for all lengths of envelopes, and an inducer facilitating the buckling can be brought into operation when the crease line reaches the associated position.

In previously known arrangements the downstream activities were based on using the lead edge of an envelope as a datum. Therefore they were envelope length sensitive. In specific arrangements of the present invention the downstream activities are based on crease line detection, which is envelope length independent.

Figure 2A:
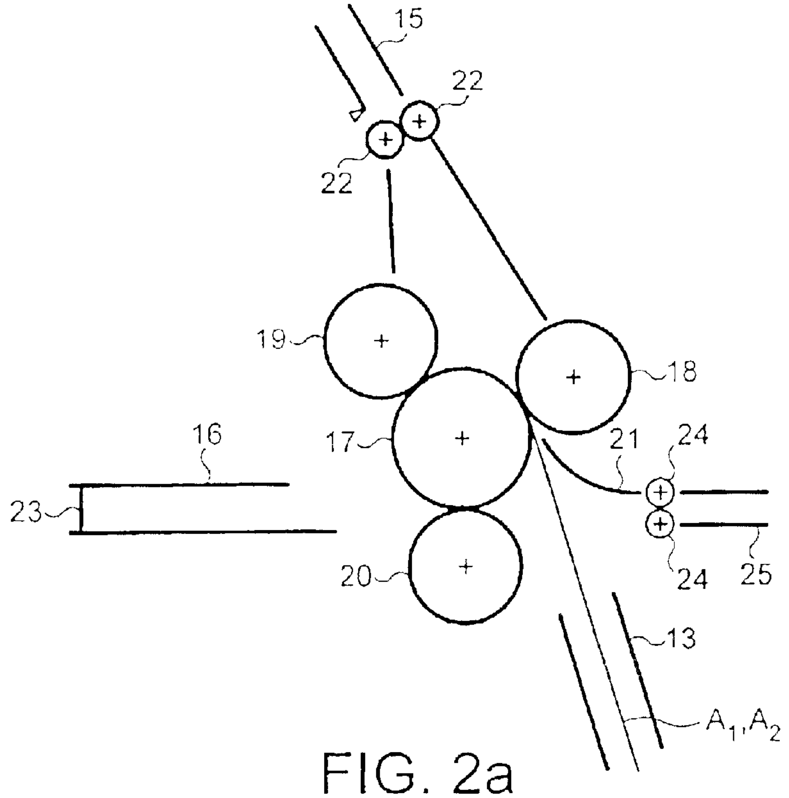
Figure 2B:
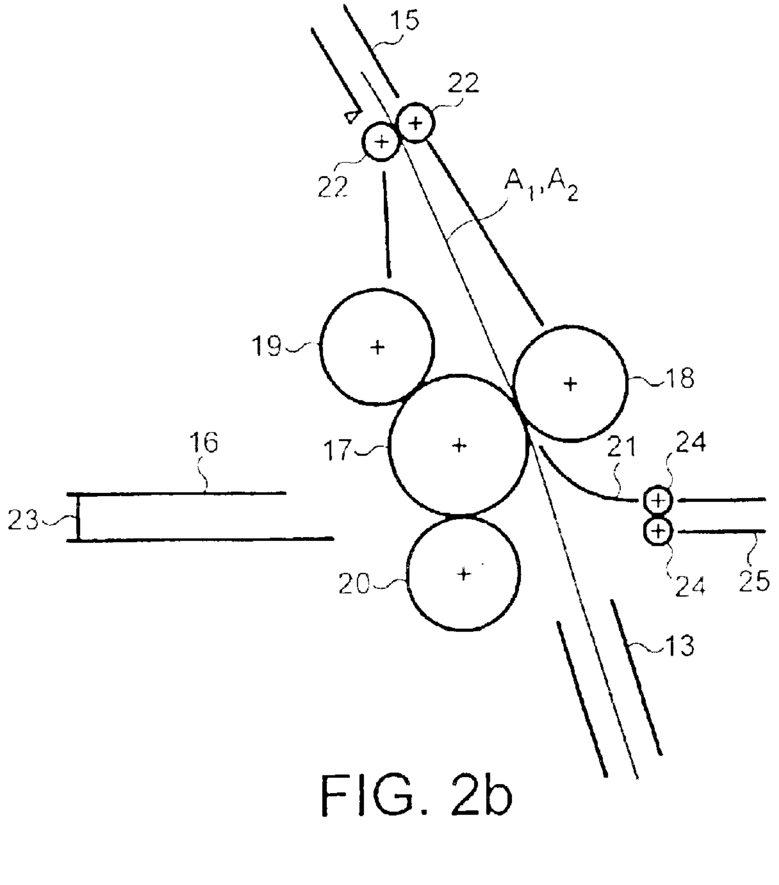
Figure 2C:
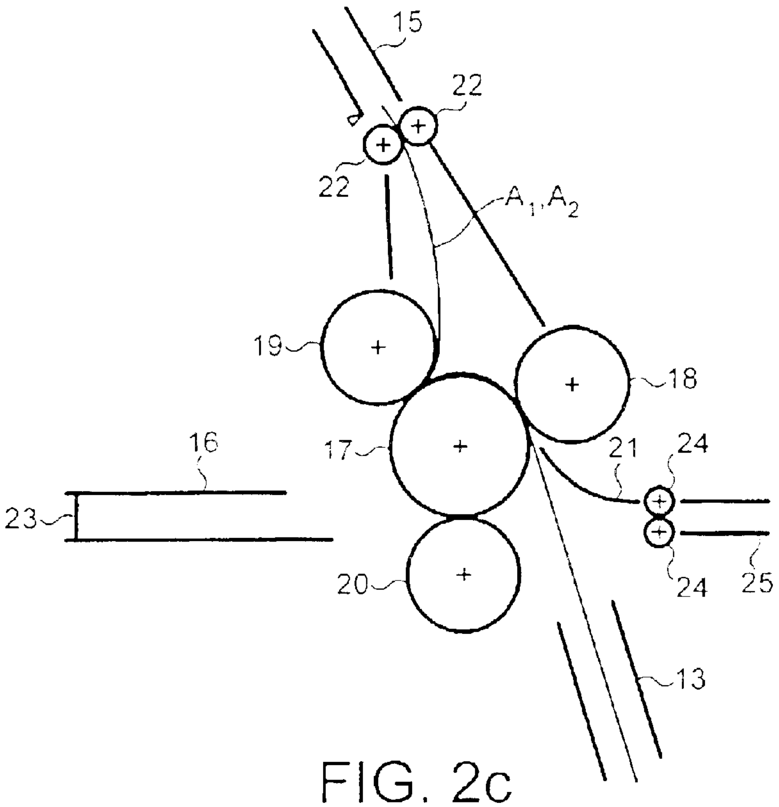
Figure 2D:
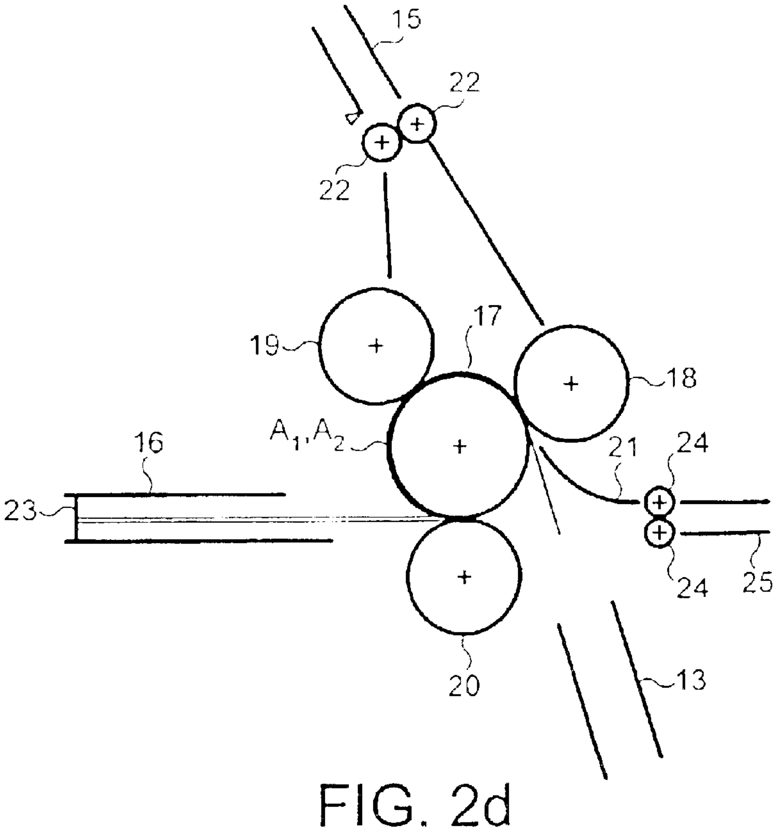
Figure 2E:
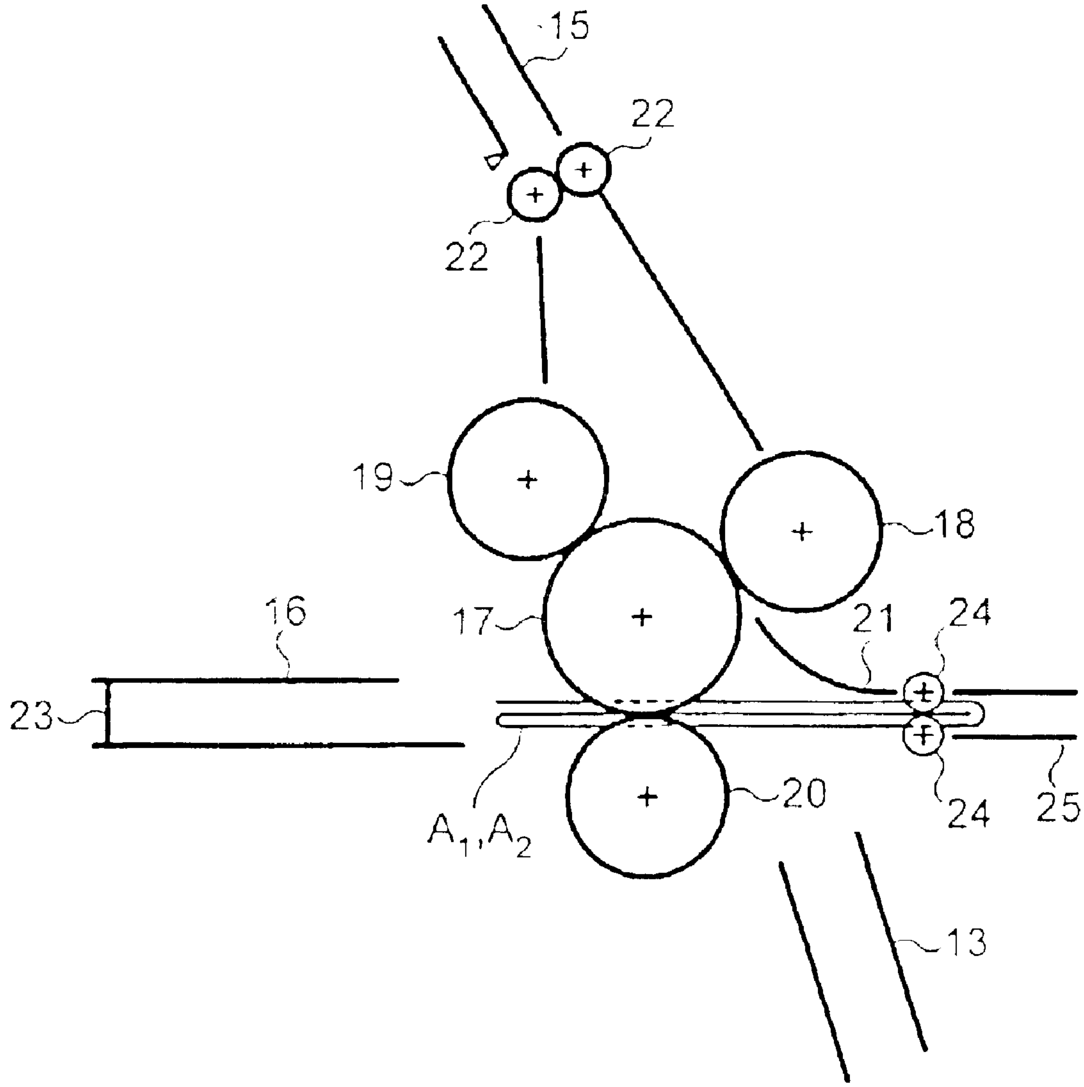
Figure 3A:
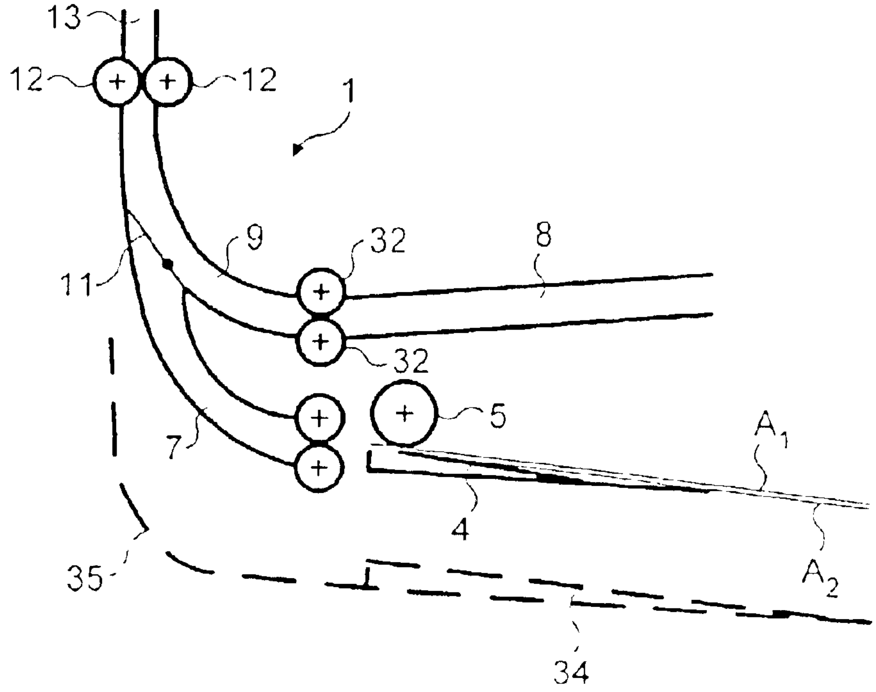
Figure 3B:
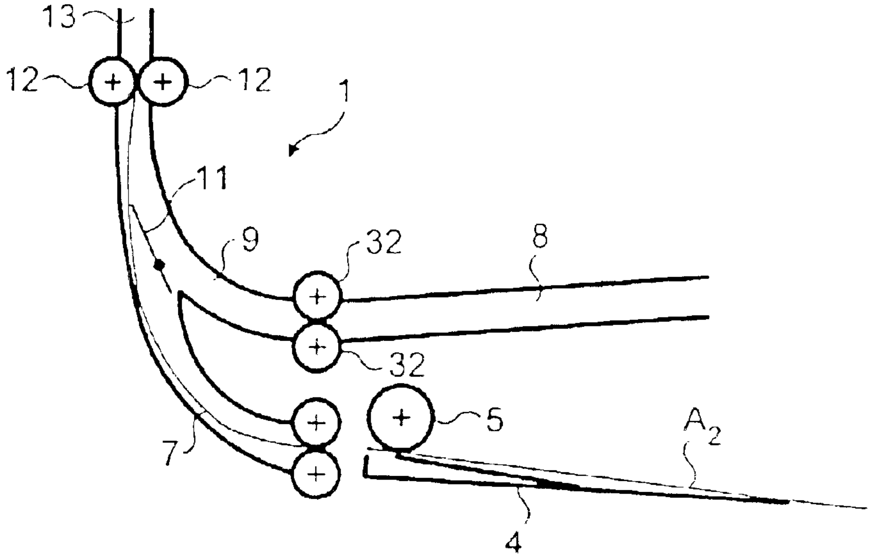
Figure 3C:
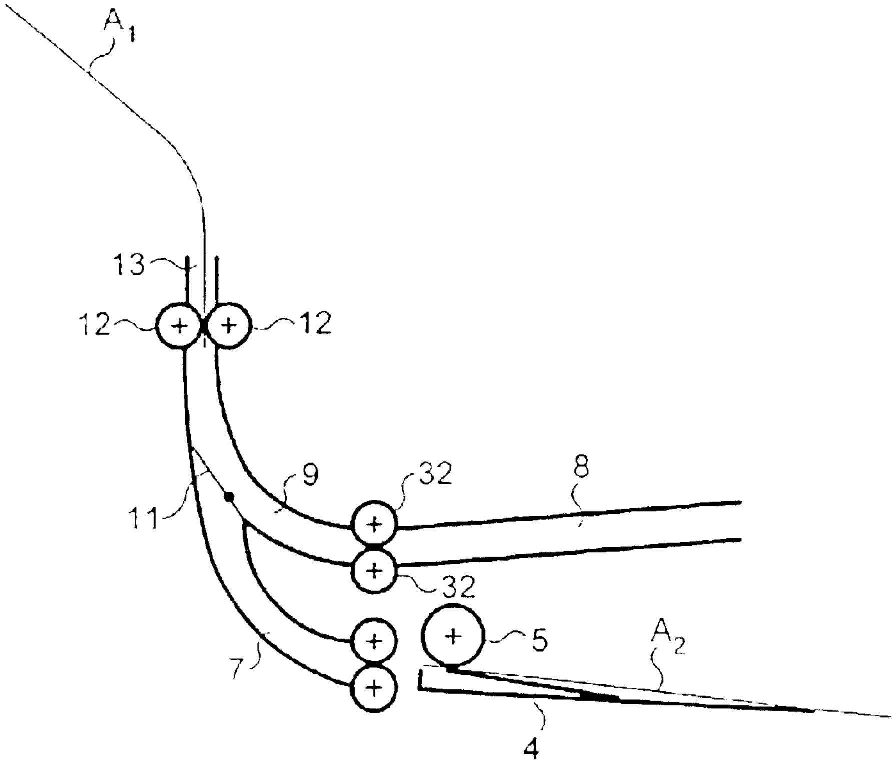
Figure 3D:
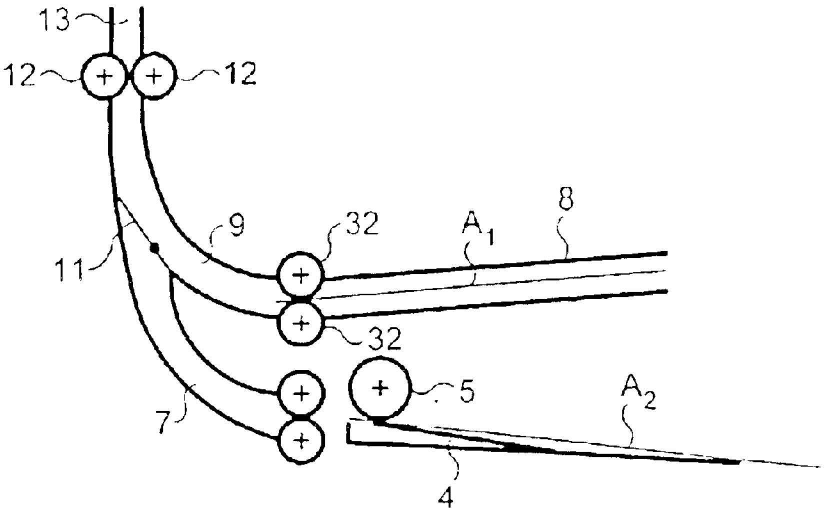
Figure 3E:
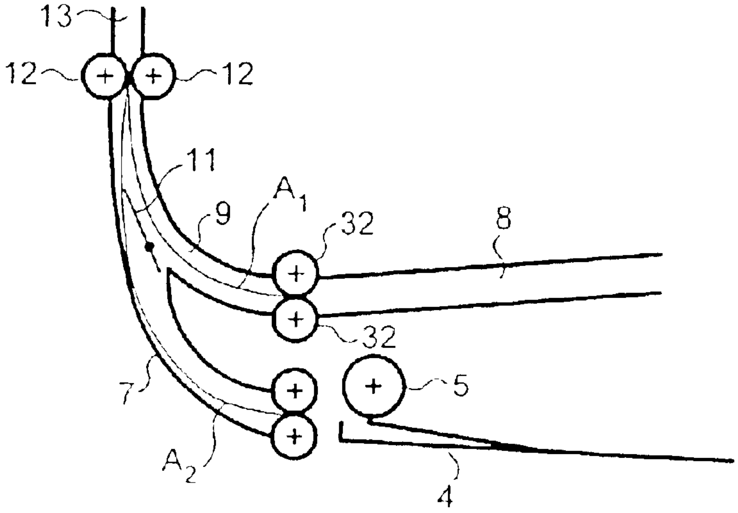
Figure 3F:
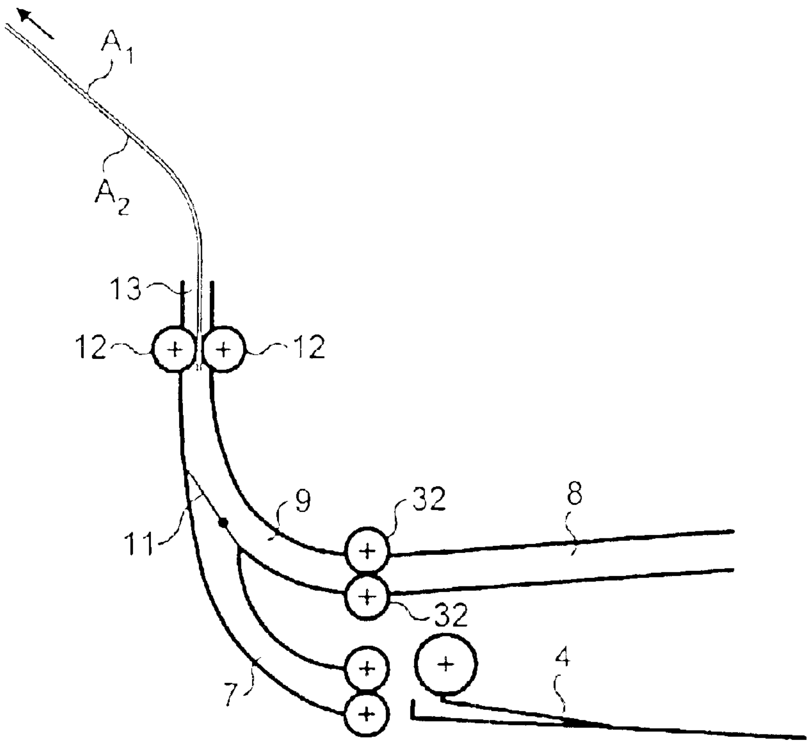
Figure 4A:
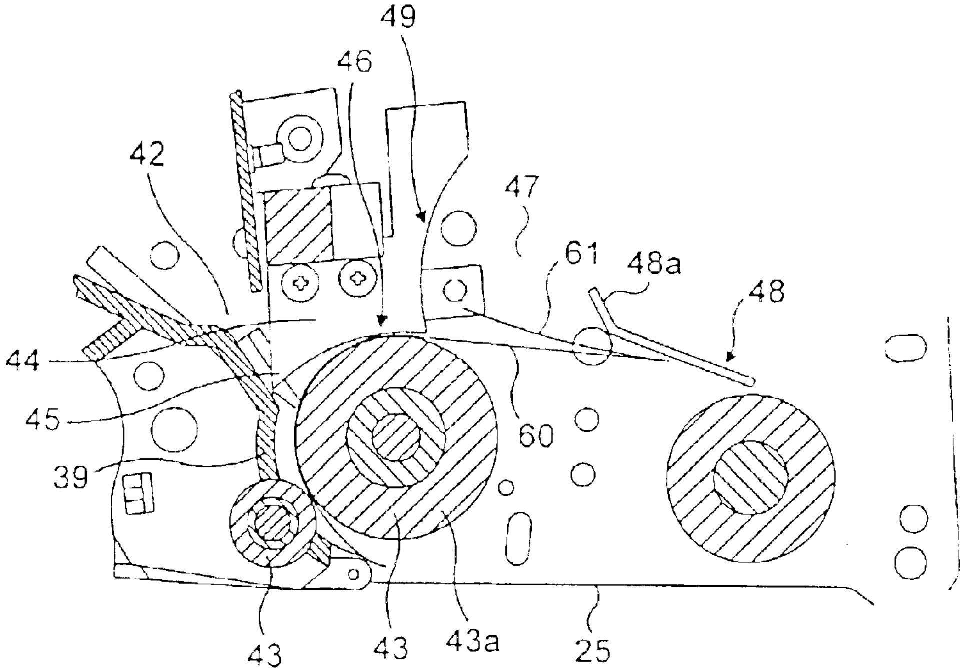
Figure 4B:
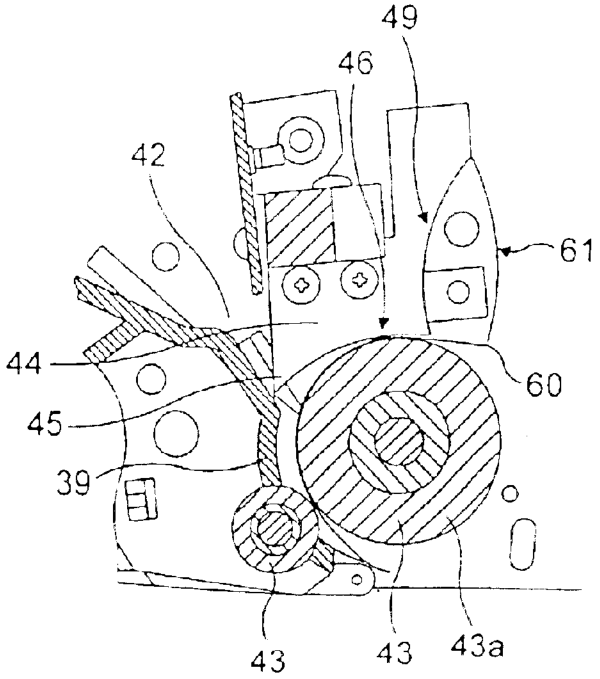
Figure 5A:
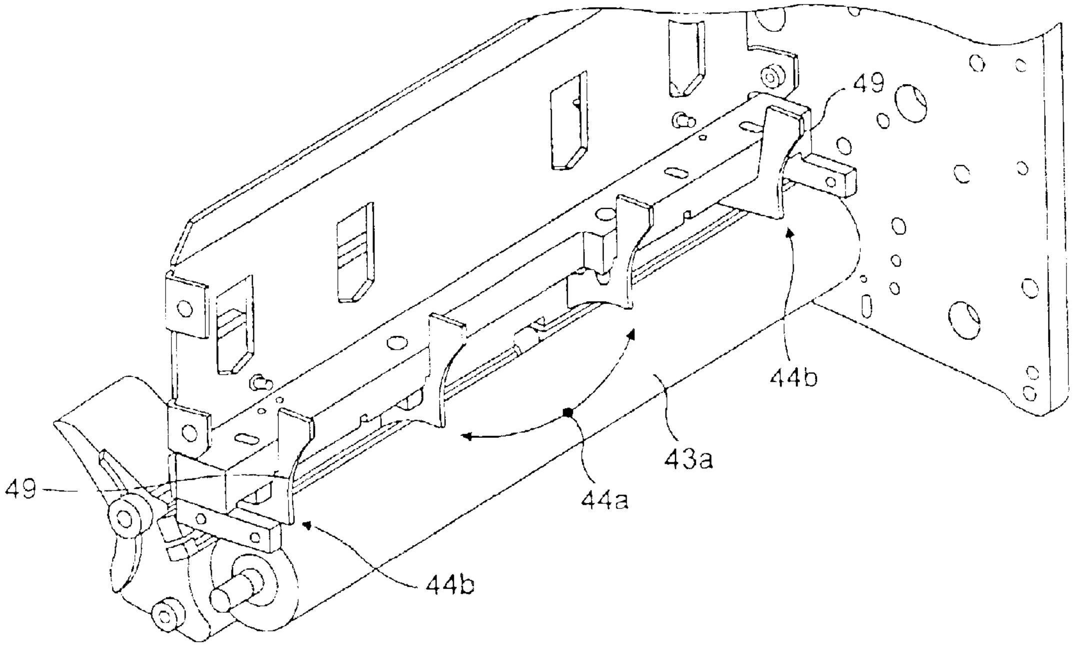
Figure 5B:
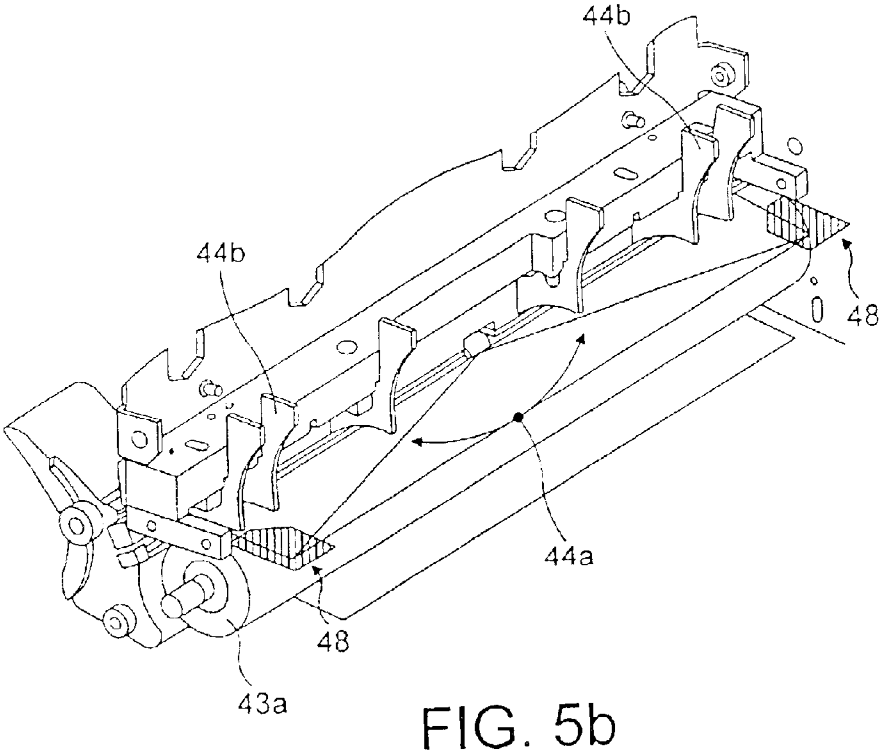
Figure 6:
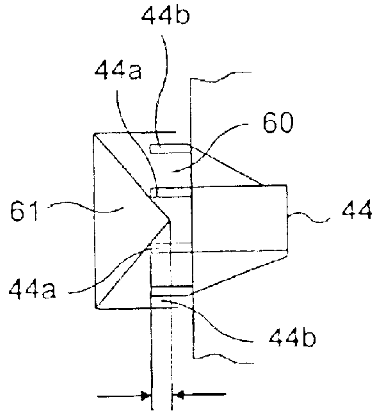

Embodiments of the invention will now be described with reference to the accompanying drawings, in which:

FIG. 1 is a vertical side sectional view through one form of folder-inserter including one form of sheet collation apparatus in accordance with the present invention, FIGS. 2*a* to 2*e* show diagrammatically successive stages in the double-folding of a sheet collation, FIGS. 3*a* to 3*f* are diagrammatic side views of the sheet collation apparatus, in successive operating conditions, FIGS. 4*a* and 4*b* show a part of the vertical side sectional view of FIG. 1, which illustrates how the flap of an envelope is opened, FIGS. 5*a* and 5*b* are perspective views of a specific embodiment of the envelope flap opening mechanism of the folder-inserter, FIG. 6 is a schematic plan view of the envelope and a flapper blade of the flap opening mechanism of FIGS. 5*a* and 5*b,*

Figure 7:
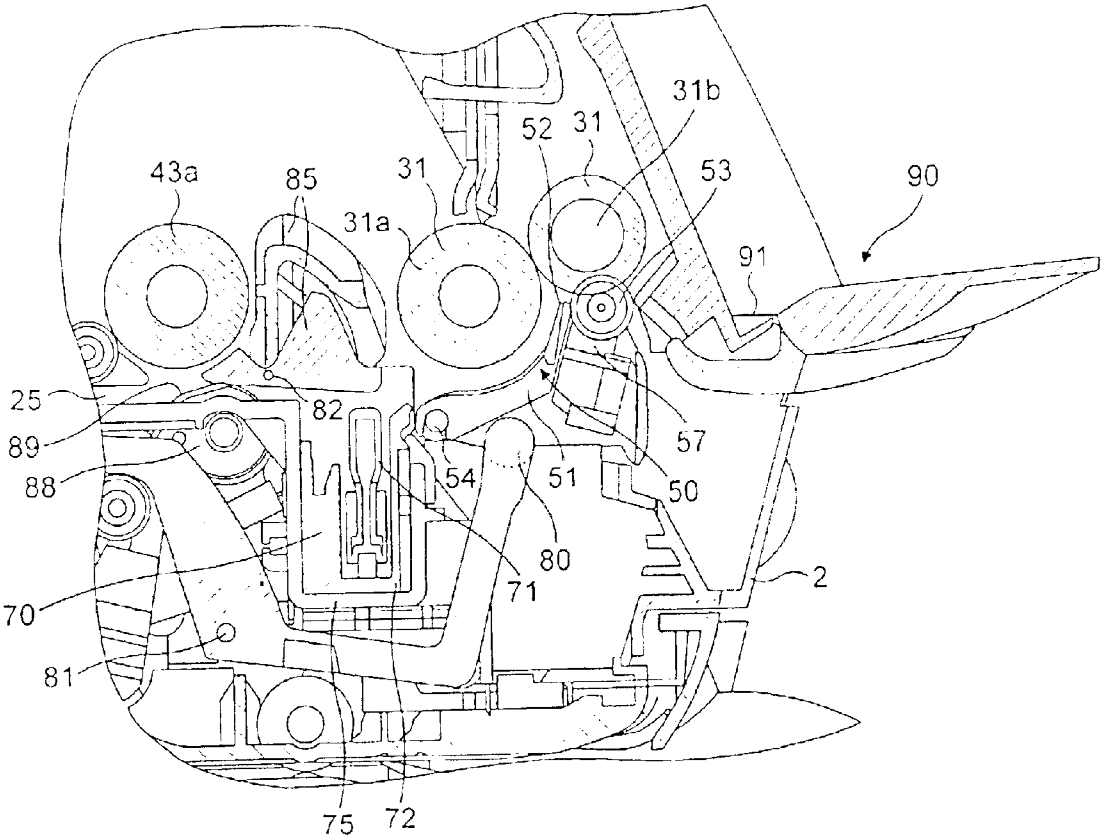
Figure 8:
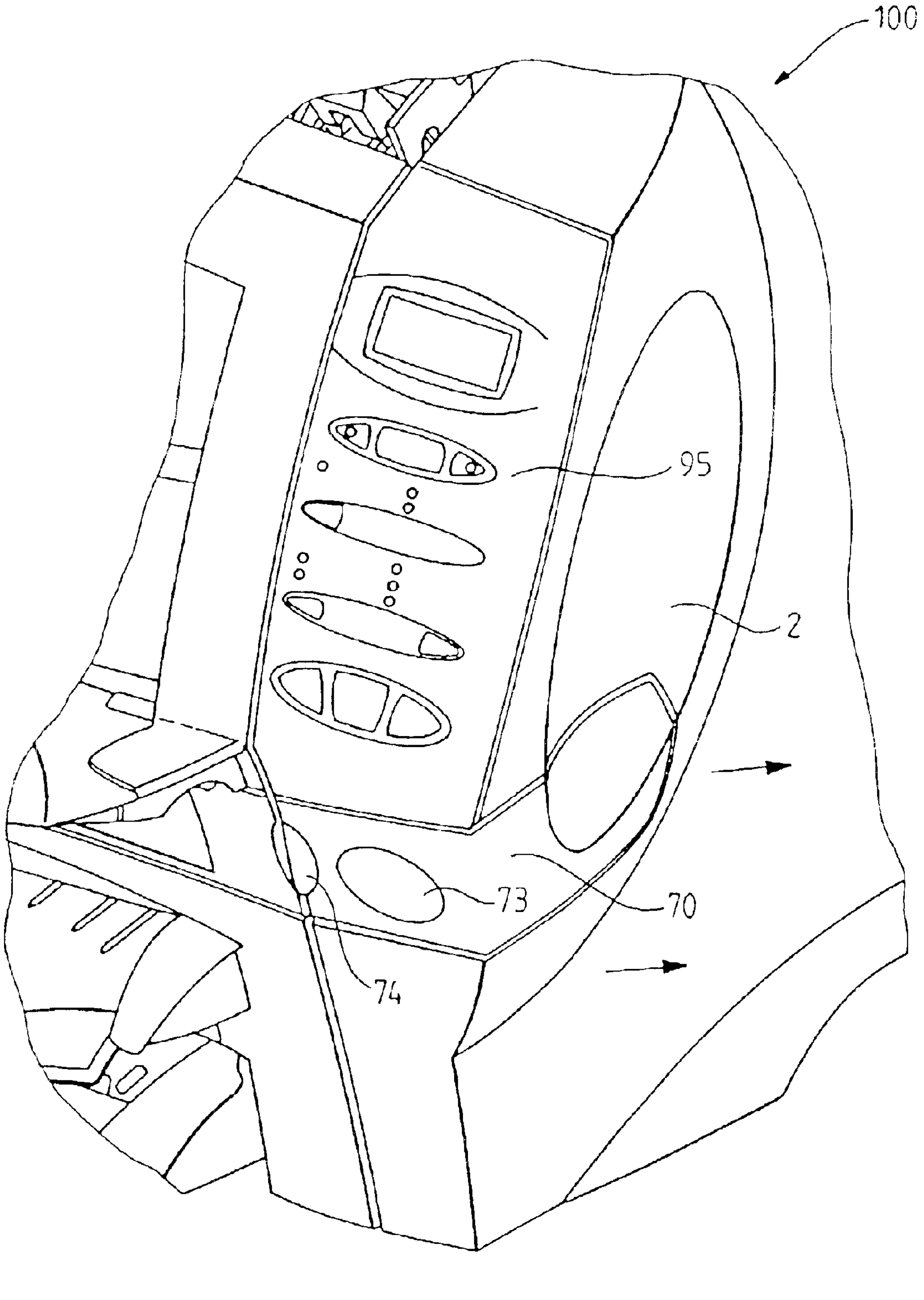
Figure 9:
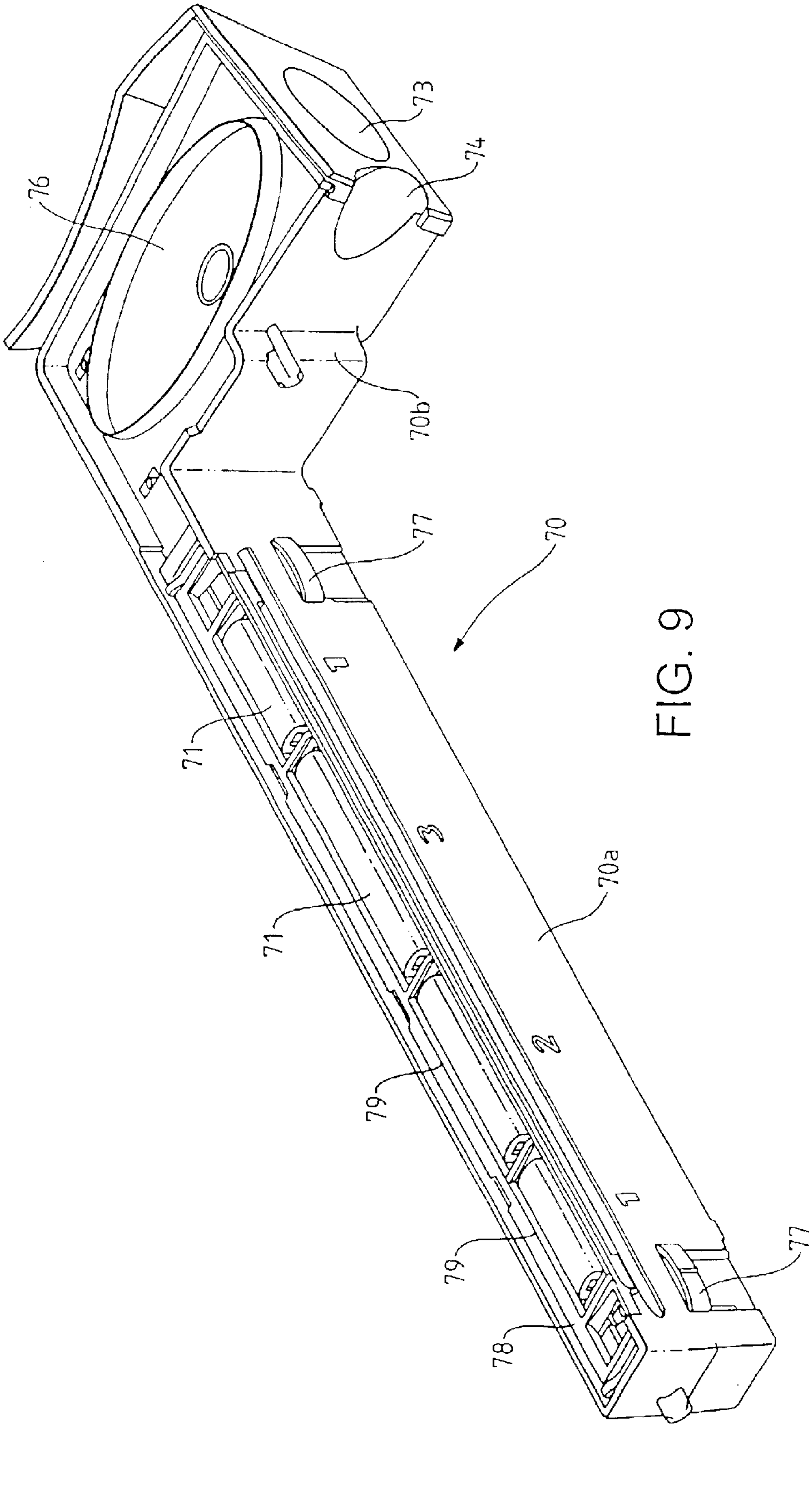
Figure 10:
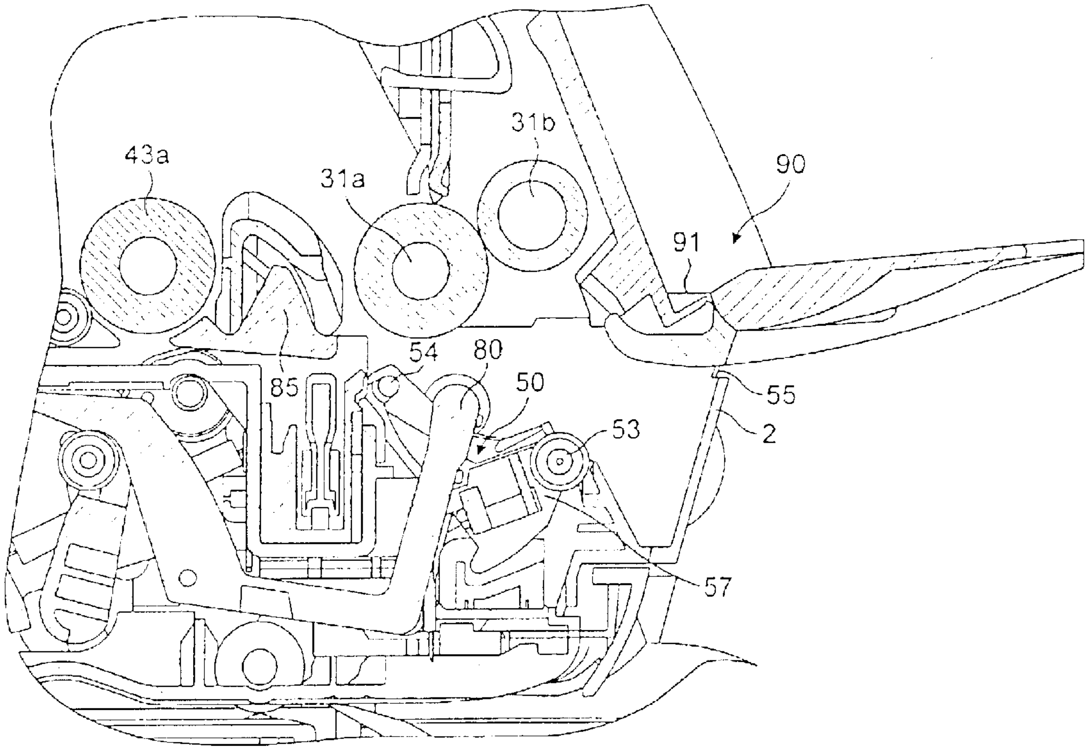
Figure 11:
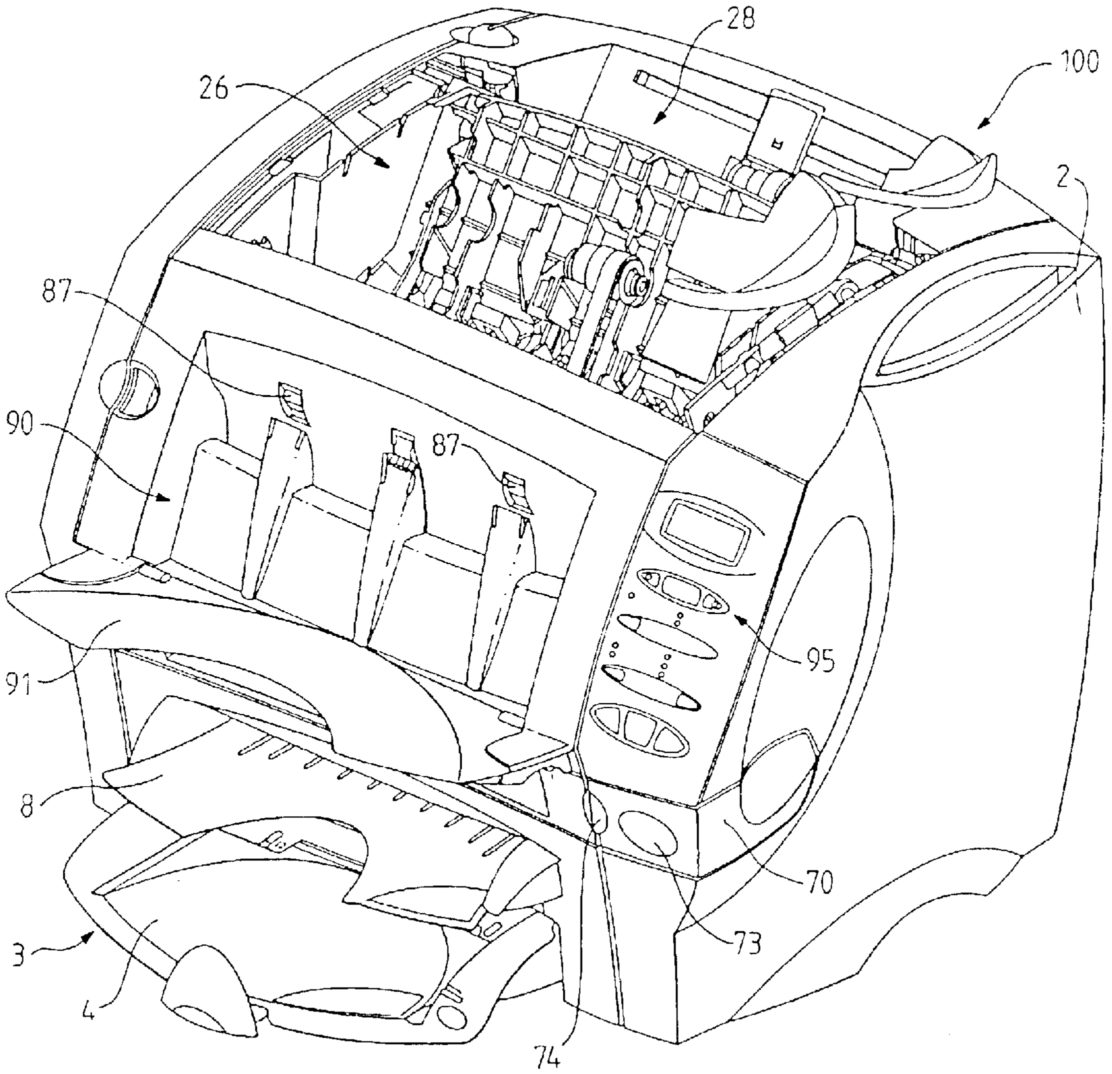
Figure 11A:
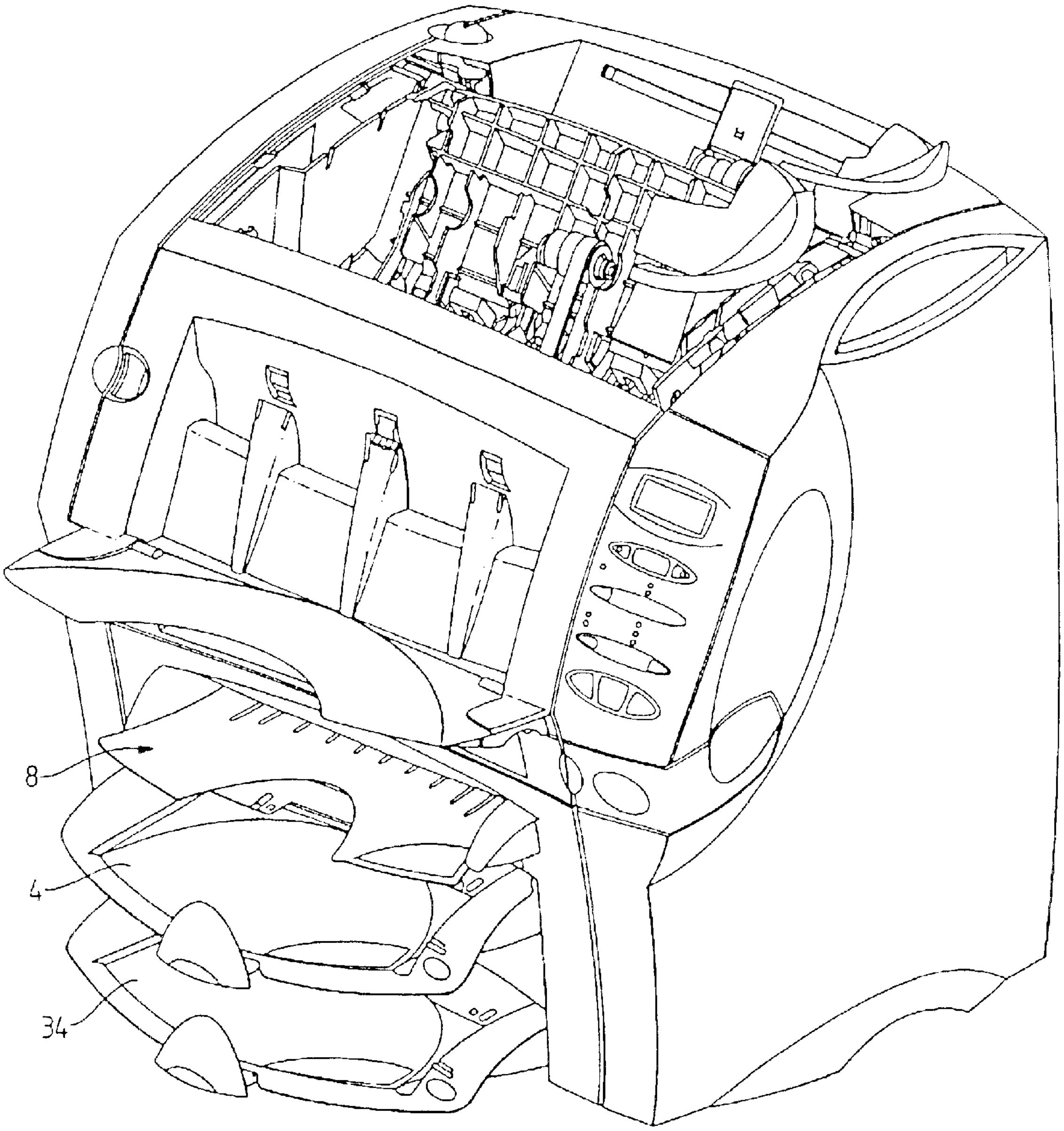
Figure 12A:
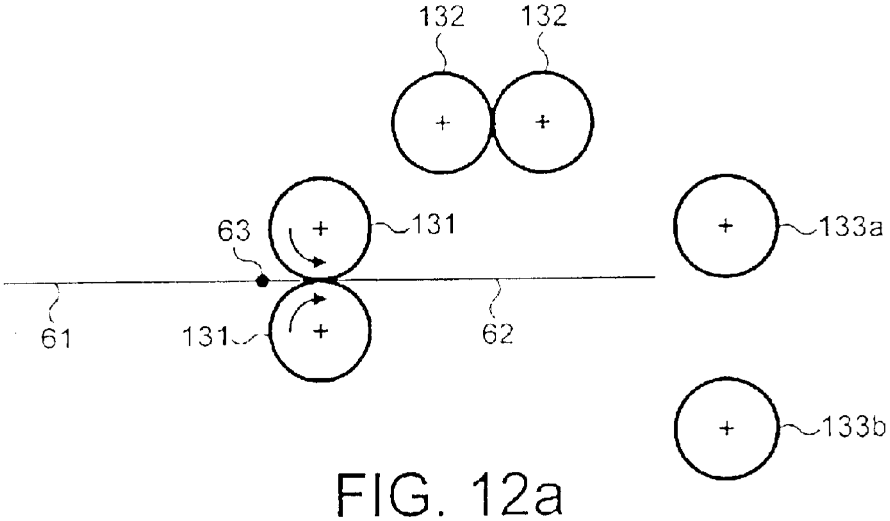
Figure 12B:
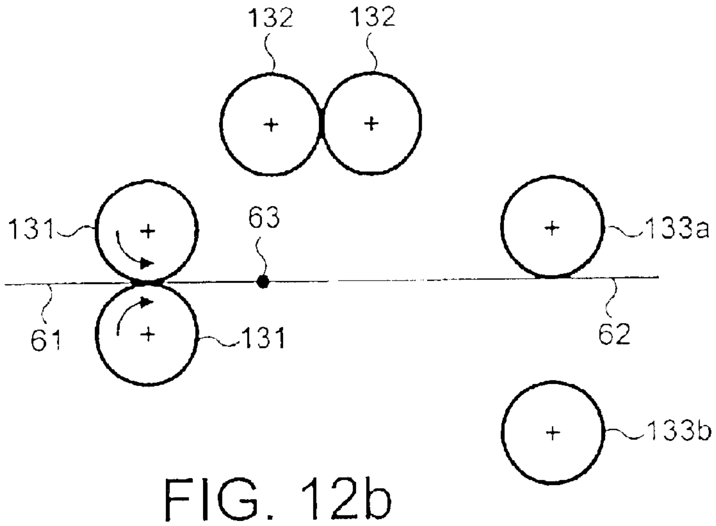
Figure 12C:
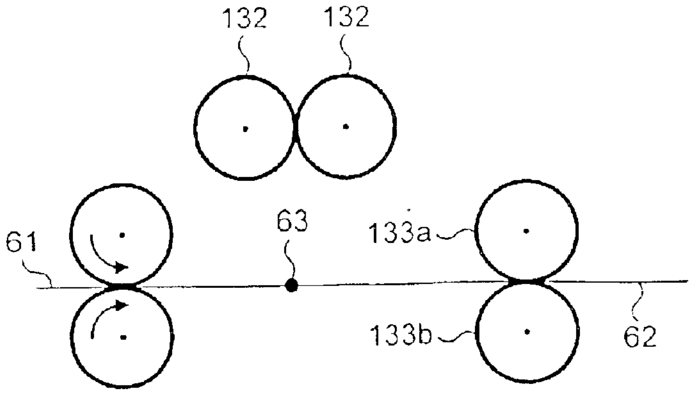
Figure 12D:
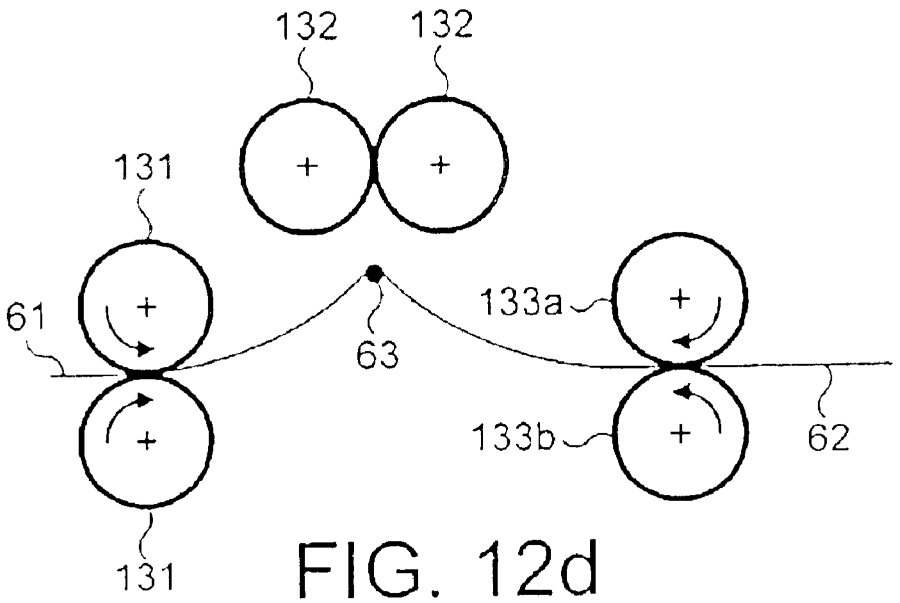
Figure 12E:
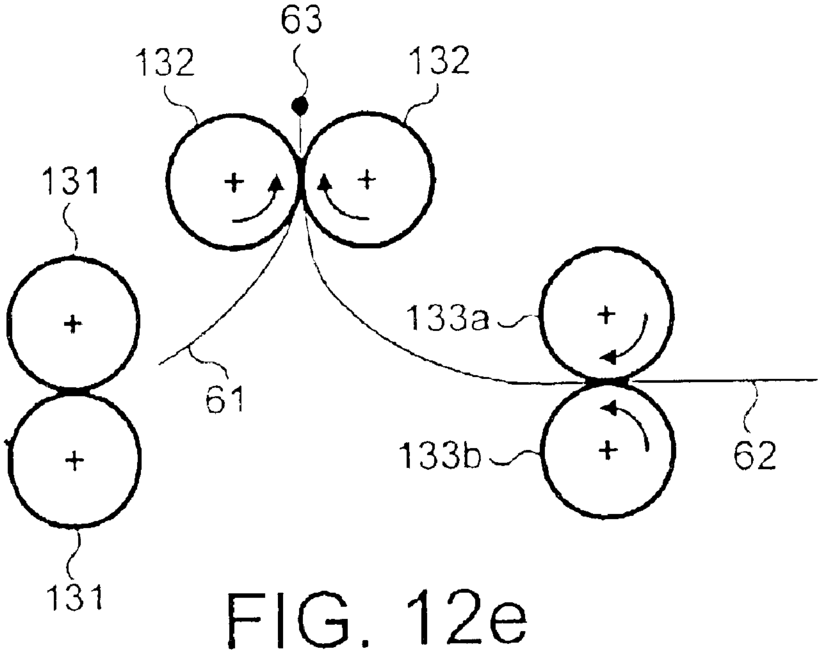
Figure 12F:
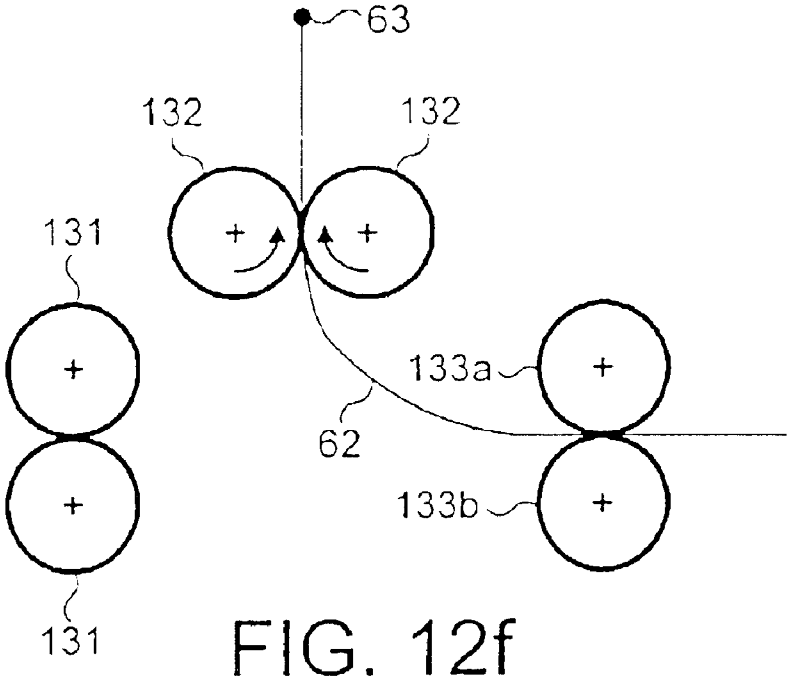
Figure 12G:
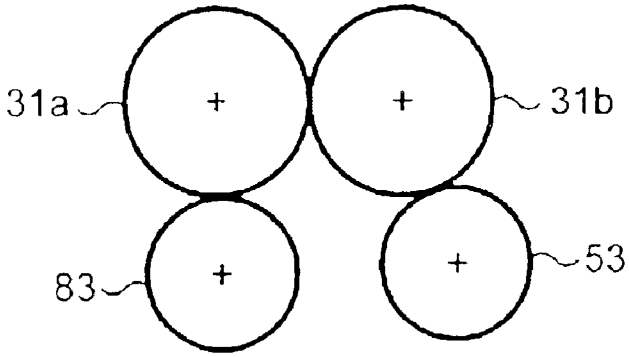
Figure 13:
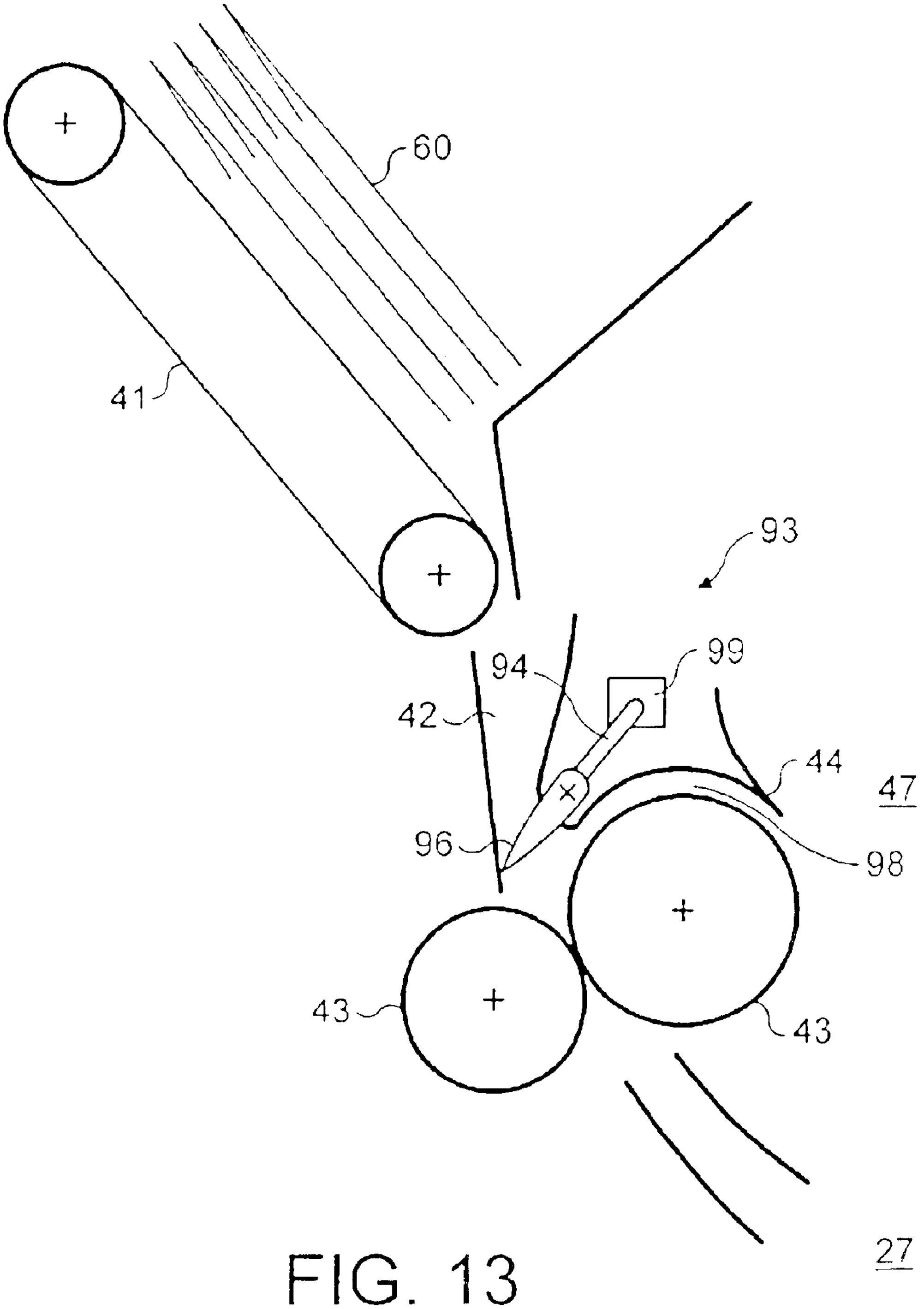
Figure 14:
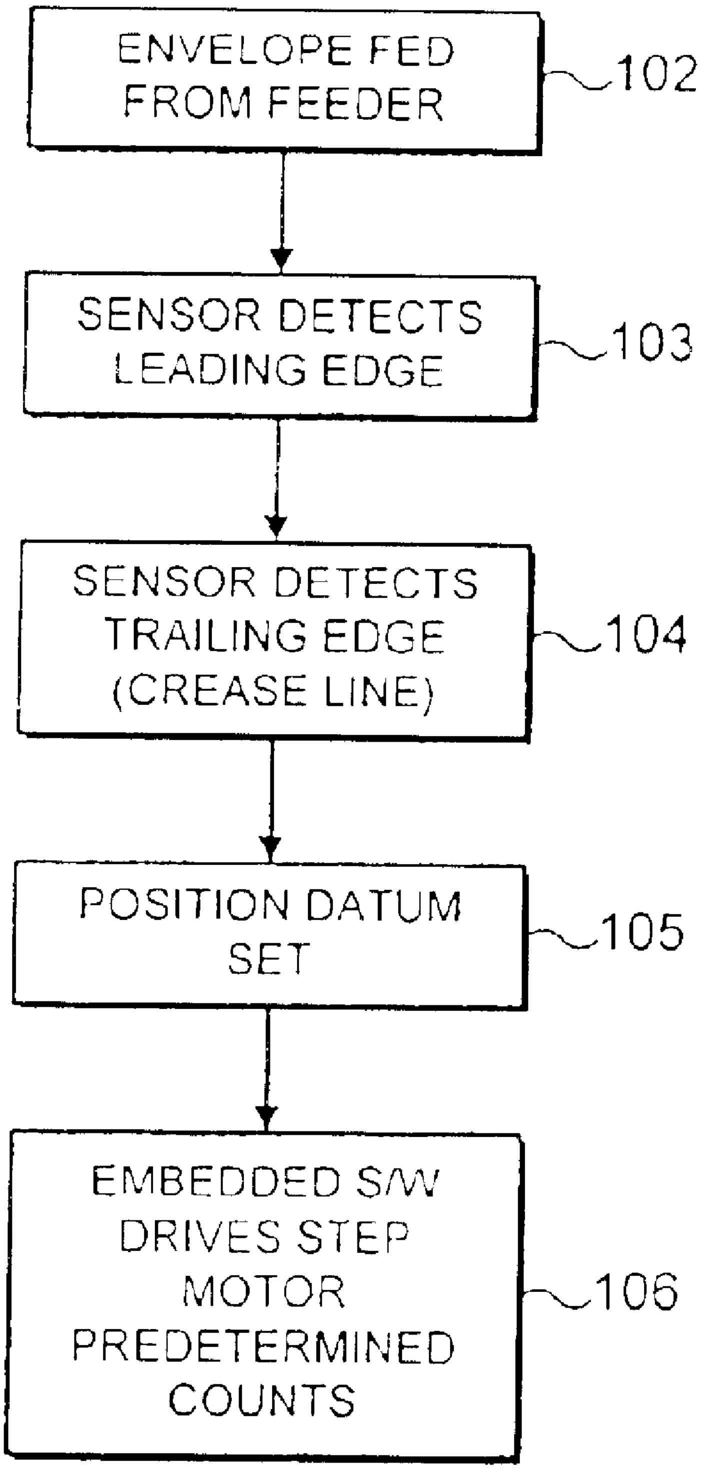
Figure 15A:
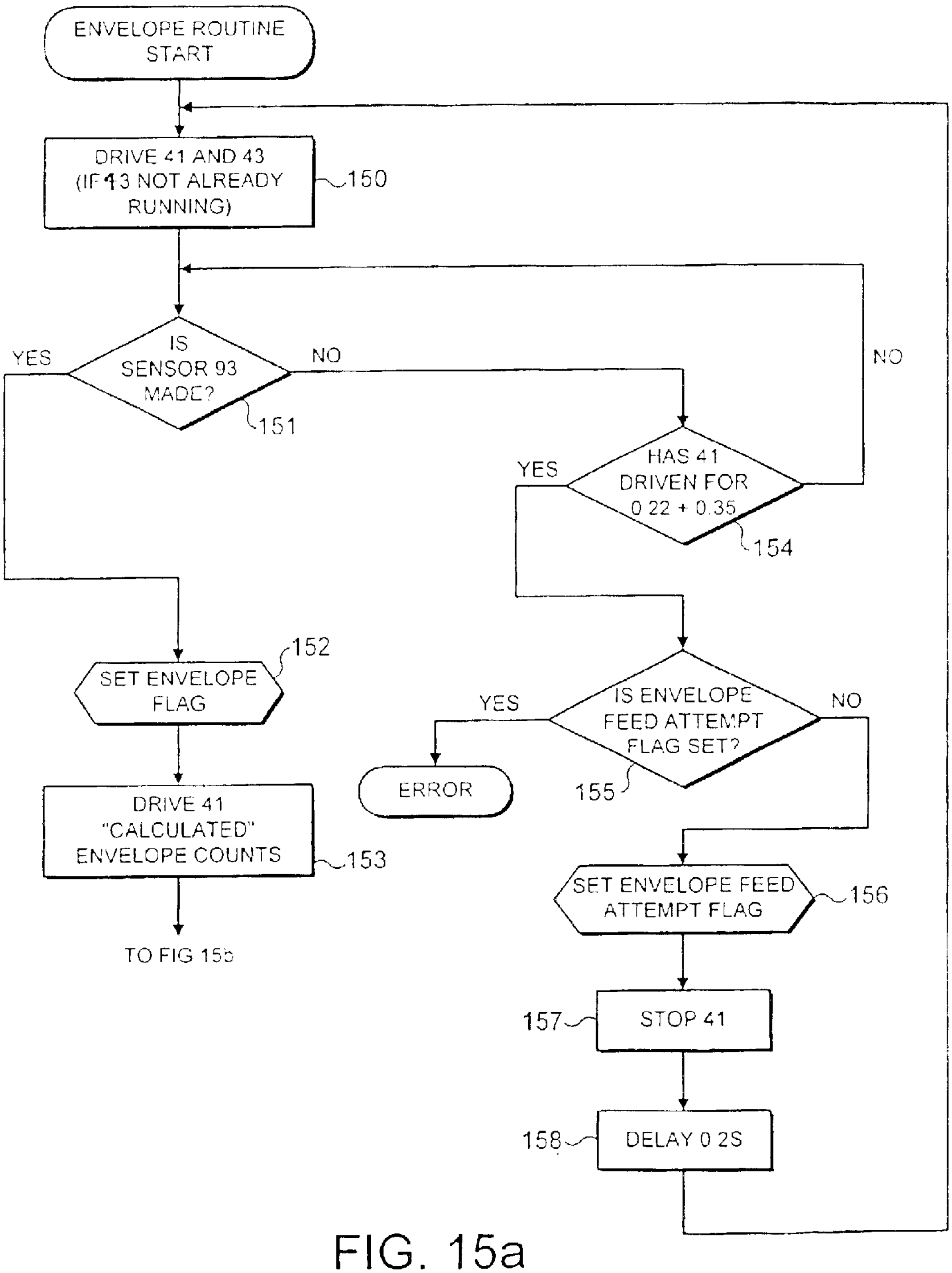
Figure 15B:
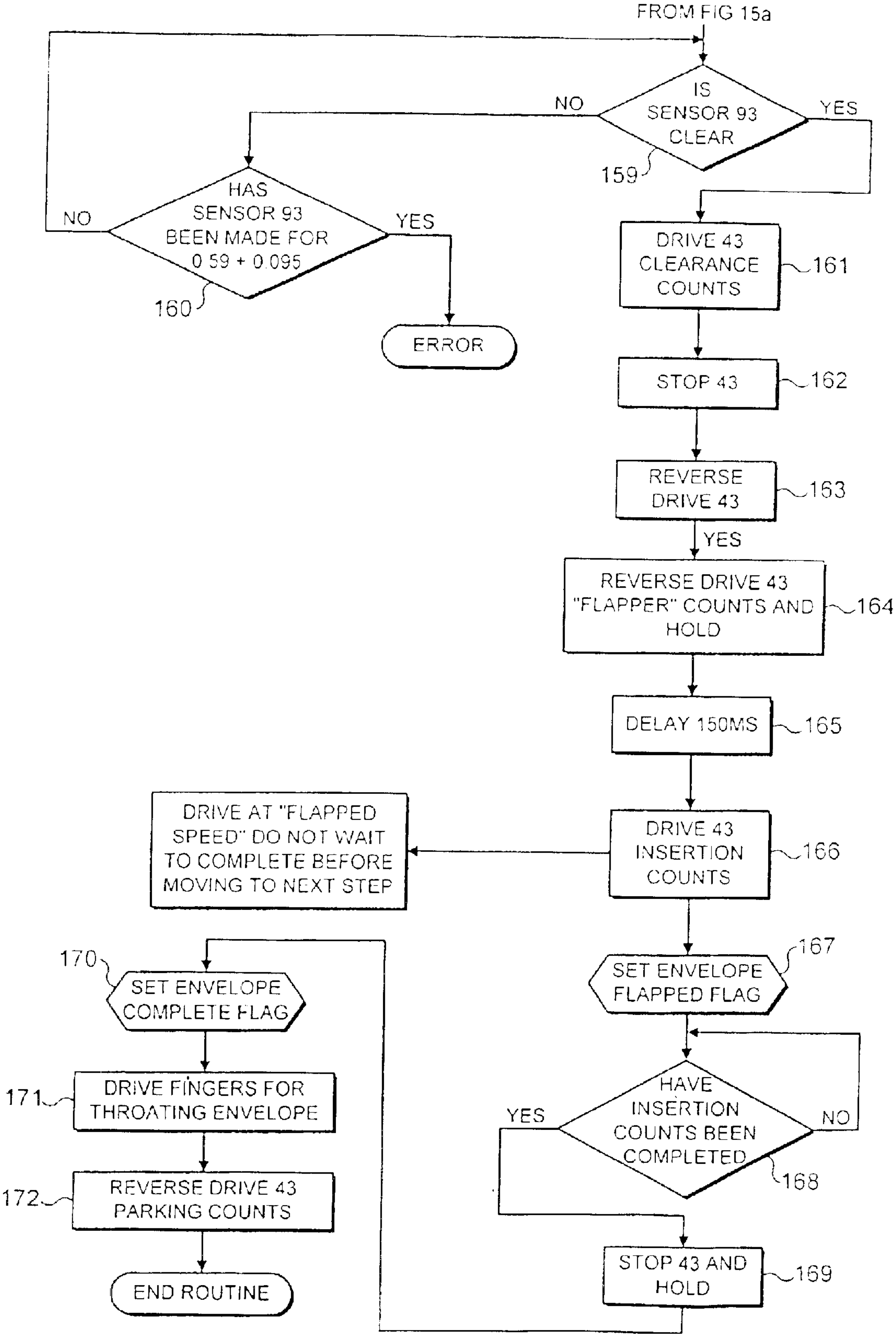

FIG. 7 is a detailed cross-sectional view through a moistener tank and sealing station of the feeder-inserter according to FIG. 1, FIG. 8 is an enlarged perspective view of a part of the folder inserter of FIG. 1 where the moistener tank is located, FIG. 9 is a perspective view of the moistener tank withdrawn from the folder-inserter of FIG. 1, FIG. 10 is a sectional view corresponding to FIG. 7 wherein an inducer of the folder-inserter is in a second, lowered position, FIG. 11 is a general perspective view of the folder-inserter according to FIG. 1, FIG. 11*a* shows a variant of the folder-inserter of FIG. 11, having a second sheet feeder, FIGS. 12*a* to 12*f* schematically describe in a sequence how a flap is sealed to a body of an envelope, and FIG. 12*g* illustrates an alternative four roller arrangement to the illustrated six roller arrangement, but which can perform an equivalent sequence, FIG. 13 is a diagrammatic side view of an envelope feeder of the folder-inserter and the flap opening mechanism, FIG. 14 is a flow chart relating to envelope feeding and sensing, and FIGS. 15*a* and 15*b* together comprise a flow chart relating to a specific embodiment of envelope feeding, flapping and preparing for insertion.

Referring firstly to FIG. 11, this shows an overall perspective view of a folder-inserter 100, as seen from the front and to one side, the folder-inserter being used for preparing a mailpiece. The folder-inserter comprises a main housing structure 2, at the front of which and at the bottom is located a sheet feeder 3 including a first sheet feeding tray 4 (feeding means). Above the sheet feeder 3 is an accumulation station 8 which is located under an output station 90 including an output tray 91. At the top of the folder inserter 100 is an envelope feeder 26 and, rearwardly thereof, an insert station 28 for feeding an optional insert sheet for the mailpiece to be prepared.

At the right side of the folder-inserter 100 at the front is a display and control unit 95 which provides an operator interface, by means of which an operator is able to control and use the folder-inserter from its front side.

In FIG. 1, there are shown internal structural components of the tabletop folder-inserter 100, which includes a sheet collation apparatus 1 of a preferred form. It is to be understood that the tabletop folder-inserter 100 is not to be regarded as the only environment for use for the sheet collation apparatus of this form. Indeed, other environments involving sheet handling are envisaged, including in particular other forms of inserter or any other mechanism requiring a collation apparatus for collating sheets of paper. For this reason, the description to be given below of the inserter 100 is only of a general character.

The precise form of the housing structure is of no particular importance, though it will normally be designed so that one or more sections can be opened by pivoting, removal or the like for access to the internal components of the inserter for maintenance and jam clearances.

As shown in FIG. 1, the sheet collation apparatus 1 includes the sheet feeder 3 provided in the lower section of the housing structure, the first sheet feeding tray 4 projecting forwardly from a front face of the inserter to enable an operator to periodically recharge the tray with fresh sheets, a separator wheel 5 and a pivotally mounted, cam operated, rocker arm 6 below the separator wheel 5, so that when pivoted into its raised position, it will urge the stack of sheets in the first sheet feeding tray 4 into engagement with the rotating separator wheel, which accordingly drives the uppermost sheet along a sheet feeding path 7.

Positioned above the first sheet feeding tray 4 is the sheet accumulation station 8 of the collation apparatus 1, for accumulating one or more sheets initially supplied from the first sheet feeding tray 4. A sheet transfer path 9 connected to the rear end of the sheet accumulation station 8 merges with the sheet feeding path 7 below a sheet collation station 10 of the collation apparatus 1. A sheet diverter or deflector 11 is pivotally mounted on pin 112 beneath the sheet collation station 10 and defines a lower guiding surface of the second, sheet transfer, path 9, the deflector being biased in a direction (anti-clockwise in FIG. 1) so as normally to be located blocking the first path. Sheet accumulation station 8 is preferably also designed as a "daily mail" tray into which so-called daily mail may be manually inserted for folding and inserting into a respective envelope. This daily mail may be a single sheet, or a number of sheets, which may or may not be stapled together, or some of which may be stapled together.

Sheets are successively fed one at a time from the sheet feeding tray 4 along the sheet feeding path 7. As the leading edge of each advancing sheet strikes the deflector 11, the latter is caused to pivot against its spring bias, thereby allowing the sheet to advance beyond the deflector to the collation station 10, at which the leading edge of the sheet is arrested in the nip defined between a pair of collation rollers 12 at the collation station, which are non-driven when the sheet is advanced into the roller nip but which are selectively drivable, in a manner to be described below.

When one or more sheets from the sheet accumulation station 8 and a single sheet from sheet feeder 3 are both advanced into the collation nip, the leading edges of the plural sheets become aligned. Once a sufficient number of sheets have been aligned to form a collation of a required, predetermined, number of sheets, as will be described in more detail below, the collation rollers are driven simultaneously to advance the sheet collation along a third, sheet feeding, path 13 to a folding station 14.

An auxiliary sheet feeding path 33, extending upwardly from the underside of the inserter 100 and merging with the sheet feeding path 7, serves for connection to a separate sheet printing appliance, e.g. laser jet or ink jet printer disposed below the inserter, or a supplementary sheet feeding tray, for use in delivering printed sheets one at a time to the collation station for inclusion in each sheet collation formed at the collation station. This path 33 provides an alternative supply of printed sheets to that provided by the sheet feeder 4. The folding station 14 serves to form two folds in the collation fed along the third path 13 from the collation station 10. It comprises a first sheet folder 15 located in an upper region of the housing structure 2 for effecting a first fold on the sheet collation and a second sheet folder 16 located in a rear region of the housing structure rearwardly of the path 13, the second sheet folder serving to fold the once-folded collation a second time. A drive roller 17 of the sheet folder is in permanent driving contact with driven rollers 18–20.

The operation of the folding station 14 will now be described with particular reference to FIGS. 2*a* to 2*e*. The sheet collation $A_1$, $A_2$ advancing along the sheet feeding path 13 from the collation station is directed by a guide 21 into the nip of rollers 17, 18 (FIG. 2*a*), which advances the collation into the first sheet folder 15, until the leading edge of the collation has reached a predetermined position in the sheet folder (FIG. 2*b*).

Preferably, the first sheet folder includes a roller pair 22 which, as the advancing sheet enters the roller nip (which event may be detected optically or in any other suitable way such as will be known to the skilled person) applies drive to the roller pair over a predetermined angular rotation and then stops, to determine the predetermined stop position of the leading edge of the sheet collation. This "intelligent" nip provides a preferred way of determining the predetermined stop position of the collation leading edge, or in other words the location of the first fold to be made to the sheet collation. Other ways of achieving such arrestation of the collation will be apparent to the skilled person, such as a stop member provided with means for setting the position of that stop member as required.

When the collation has been arrested with its leading edge in the predetermined position, continuing drive imparted to the trailing section of the collation causes the section of the collation between the rollers 18, 19 and roller pair 22 to buckle rearwardly and enter into the nip between roller pair 17, 19, to form a first fold in the sheet (FIG. 2*c*). The sheet collation is then advanced between the roller pair 17, 19 with its folded edge leading and into the second sheet folder 16.

This folder includes a manufacturer adjustable stop 23 (for the US or European market) which arrests the leading edge of the folded collation while the roller pair 17, 19 continues to drive the trailing section of the collation to cause the section between that roller pair and the folding station 14 to buckle forwardly and downwardly into the nip of the roller pair 17, 20, to form a second fold in the collation (FIG. 2*d*). The position of the stop 23 determines the position of the second fold.

This roller pair 17, 20 advances the double-folded sheet collation across the feed path 13 and into the nip of a further drive, driven roller pair 24, which advances the double-folded sheet collation along a further path 25 (FIG. 2*e*) to a stuffing station 27 (FIG. 1), to which an envelope from the envelope feeder 26 has been advanced. The arrangement produces a C-fold as schematically indicated in FIG. 2*e*. Referring now to FIG. 1, the envelope is thereby forwarded by a traction belt 41 along a path 42 to a roller pair 43 by which the envelope's flap is engaged with a flapper blade 44 so that the envelope is held rear face down and envelope flap open and trailing. The double-folded sheet collation is then driven into the waiting envelope until its leading folded edge engages the crease along the bottom edge of the envelope. Optionally, an insert sheet can be advanced from insert station 28, when the second fold in the collation is formed by the nip between roller pair 17, 20, which is then fed along the feed path 25 into the open envelope at stuffing station 27.

Thereafter, the stuffed envelope is driven successively to a moistener 29, which moistens the flap of the envelope, and to a sealing station 30. The sealing station 30 includes an inducer 50 which is moved towards a sealing roller pair 31, which is also part of the sealing station 30 and which closes and seals the moistened flap against the rear panel of the envelope and ejects the thus-prepared mailpiece from the front of the folder-inserter 100.

The operation of the collation apparatus will now be described in more detail with reference to FIGS. 3*a* to 3*f*.

FIG. 3*a* shows the top two sheets $A_1$, $A_2$ of a stack of sheets held in the sheet feeding tray 4. A second sheet feeding tray indicated schematically at 34 may be disposed beneath the first sheet feeding tray as illustrated schematically in FIG. 3*a*, either integrally with the rest of the folder-inserter as illustrated in FIG. 11*a*, or as a "bolt-on" unit to that of FIG. 11. The construction and basic operation of tray 34 may be equivalent to that of tray 4, with a respective feed path 35 leading to the collation station. At the beginning of an operational cycle, the cam operated rocker arm 6 (shown only in FIG. 1) pivots upwardly to cause the driven separator wheel 5 to apply drive to the uppermost sheet $A_1$, which accordingly is driven from the sheet feeder along path 7, past the spring biased diverter 11, and into the nip of stationary collation rollers 12 (see FIG. 3*b*). The leading edge of sheet $A_1$ is arrested in the collation nip and drive is removed from the trailing edge of the sheet.

After a brief pause, drive is applied to the rollers 12, to advance the sheet $A_1$ along path 13 until the trailing edge of the sheet has cleared the deflector 11, which again returns under spring bias to its position blocking the feed path 7. Drive is then removed from the collation rollers to hold the sheet $A_1$ stationary in this position (FIG. 3*c*). The trailing edge of sheet $A_1$ moving clear of deflector 11 can be detected in any suitable manner, e.g. optically.

Following a further pause, the rotational direction of collation rollers 12 is reversed. The advancing edge of the sheet initially strikes deflector 11, which diverts the sheet along transfer path to accumulation station 8, at which a pair of rollers 32 in vertical driving contact take over advancement of sheet $A_1$ until it is brought to rest (FIG. 3*d*).

Drive is then applied both to separator wheel 5 of sheet feeder 4 and roller pair 32 of accumulation station 8, to advance the next sheet $A_2$ and the initial sheet $A_1$, respectively, along paths 7, 9 and into the collation nip of collation rollers 12 to align their leading edges, thereby forming a collation of two sheets (FIG. 3*e*).

If a collation of three of more sheets is required, the above described operational steps are repeated, where the sheet collation $A_1$, $A_2$ is handled as described above for the initial sheet A when at the collation station (FIG. 3*b*), and a collation is formed between the collation $A_1$, $A_2$ and the next sheet ($A_3$) from the sheet feeder 4 to form collation $A_1$, $A_2$, $A_3$, such procedure being repeated until the collation consists of the required number of sheets. Thereafter, the collation rollers 12 are driven to advance the collation $A_1$, $A_2$ . . . etc along path 13 from the collation station 10 to the folding station 14 (FIG. 3*f*).

In an alternative method of operation, the second sheet feeding tray 34 can be used as the main sheet feeder and thus feeding paper to the accumulator tray 8, and with the first tray 4 used for adding a single sheet to be collated therewith.

Referring now to FIGS. 4*a*, 4*b*, 5*a*, 5*b* and 6, the opening of the flap of an envelope will be described in more detail.

A plurality of envelopes are stored unflapped in a stack in the envelope feeder 26 (FIG. 1), and orientated with their rear faces towards the traction belt 41 and the envelope flaps uppermost and furthest from the path 42. (See also FIG. 12, and the corresponding description thereof, for a schematic view of the layout). By actuating the traction belt 41, a single unflapped envelope is fed downwards along path 42 into the nip of roller pair 43. The roller pair 43, which includes an arching roller 43*a*, drives the envelope further downwards until the trailing edge of the envelope passes a deflecting edge 45 of the fixed flapper blade 44. The drive of the roller pair 43 is then reversed so that the trailing edge becomes the leading edge and the envelope is forced by a diverter element 39 facing the arching roller 43*a* to come into contact with a deflecting surface 46 of flapper blade 44. The envelope is caused to follow the curvature around the arching roller 43*a* as a result of the deflecting surface 46 of flapper blade 44, and is driven along a flapper path which adjoins the path 42 until the flap is completely within a flapping chamber 47 or zone. Optionally, deflector means 48 are arranged inside the flapping chamber 47 to slightly spread the flap apart from the envelope, and initiate and facilitate flap opening, since the envelope is buckled downwards by the deflector means 48. The contact of the envelope with the deflector means 48, which have an angled guide part 48*a*, might serve as an indicator to reverse the feed direction of the envelope again. For example, a movement of the deflector means 48 around part 48*a* may indicate contact with the envelope 60 when its flap 61 is completely within the flapping chamber 47, as shown in FIG. 4*a*. When reversing the feed direction back again, the partially opened flap 61 of the envelope 60 is now engaged by the flapper blade 44, so that the flap is stripped away from the body of the envelope. As the envelope is driven further by roller pair 43, which is disposed downstream of the junction between the flapper path and path 42, the flap 61 is completely opened by sliding on an opening surface 49 of the flapper blade 44, as shown in FIG. 4*b*, and being drawn between the arching roller 43*a* and the deflecting surface 46 of flapper blade 44. Thus, the envelope is fed into path 25 with an open flap to receive the double collation sheet at the stuffing station 27, where spring biased fingers (not shown) hold the envelope open.

In FIGS. 5*a* and 5*b* two embodiments of flapper blade 44 are illustrated. FIG. 5*a* shows a flapper blade 44 comprising four plate-like blade parts or elements 44*a*, 44*b* each having a flap opening surface 49. The two inner blade parts 44*a* are equally spaced apart from the central line of an envelope so that the tip of the flap is arranged between those two blade parts 44*a*, which are held at a fixed height position above the arching roller 43*a*. See also FIG. 6.

In FIG. 5*b* an envelope with flap 61 is shown which is deflected by two deflectors 48, positioned at the right and left edge of the envelope, to partly open the flap of the envelope on being engaged by the deflectors 48. The embodiment of FIG. 5*b* illustrates a six part flapper blade 44 in the form of pairs of plate-like blade parts 44*a*, 44*b*, 44*c*. The blade parts 44*b* of both embodiments, and parts 44*c* of the embodiment of FIG. 5*b*, serve as guide elements, whereas the opening of the envelope is performed by the two inner blade parts 44*a*. The gap between the two inner blade parts 44*a* allows the amount of travel of envelope inside the flapping chamber 47 to be reduced by the amount indicated by two arrows in FIG. 6, since the tip of the flap is disposed between the inner blade parts 44*a*, which are spaced apart from each other. Thus, the individual flap length of different envelopes does not have to be considered, as schematically illustrated in FIG. 6.

With reference to FIGS. 7, 8 and 9, it will now be described how liquid is transferred onto an envelope flap for use in sealing it to the body of an envelope. Alternatively, the liquid could be used to moisten the body of the envelope.

As can be seen in FIG. 7, liquid is stored in a moistener tank 70 in which a capillary action fitted wick 71 is accommodated and serves to deposit liquid onto the flap of an envelope from underneath. The moistener tank 70 comprises a tank housing 72, generally U-shaped in cross-section, which forms a space to store the liquid. The tank housing 72 is placed in a watertight channel 75 by means of which leaking liquid can be collected and led away from the interior of the folder-inserter 100.

The liquid level in the moistener tank 70 is visible to an operator at the front of the folder-inserter 100 through a transparent window 73, which can comprise a scale to indicate how much liquid is contained in the moistener tank 70. For this purpose, the transparent window 73 is arranged substantially on the same level at which the liquid is surrounding the wick 71 inside the moistener tank 70, with folder-inserter 100 placed on a horizontal surface. Thus, the transparent window 73 indicates to the operator when the tank needs to be refilled with liquid.

If the operator wants to refill the moistener tank 70, the moistener tank 70 can be partially removed from the housing structure 2 of the tabletop inserter 100 by pulling it out to the side in a horizontal direction, as indicated by the two arrows in FIG. 8, until it reaches a detent position. In this detent position, the moistener tank 70 protrudes out of the housing structure 2 so that a refill opening 76 is exposed and liquid can be poured into the opening 76 from above. For this refilling, the moistener tank 70 comprises a recess 74, which can be manually engaged for pulling the tank out of the side of the housing structure 2.

As can be seen in FIG. 9, a plurality of wicks 71 are arranged in a line to deposit liquid onto the flap of an envelope. The tank housing 72 is covered by a plate like cover 78 which has openings 79 through which the tops of the wicks 71 protrude upwards out of the vessel which is formed by the tank housing 72 and the cover 78. If the wicks are contaminated with envelope gum due to a long use, the used wicks can be replaced by new ones, simply by pulling them upwards out of the tank 70 and loading new wicks by dropping them down through the corresponding openings 79 of the cover 78. This can be achieved by the operator when the moistener tank 70 is completely removed from the housing structure 2. Thereafter the moistener tank 70 has to be inserted again into the watertight channel 75 starting with a first portion 70*a* of the moistener tank 70 which has an elongate shape and accommodates the wicks 71. A second portion 70*b* of the moistener tank 70 is substantially perpendicularly arranged to the first portion 70*a* and includes the opening 76, the transparent window 73 and the recess 74. In the partly-removed detent position of the moistener tank 70, substantially only the second portion 70*b* of the moistener tank 70 protrudes in a horizontal direction out of the housing structure 2, in order to allow refilling of the tank 70 with liquid. This detent position of the moistener tank 70 is reached if a plurality of clips 77 have been snapped in corresponding recesses in the watertight channel 75. When the moistener tank 70 is completely inserted back again into the housing structure 2, the clips 77 will have snapped in corresponding further recesses in the watertight channel to achieve a predetermined position of the moistener tank 70 and depositing of liquid onto the envelope flaps by the capillary action of the wicks. The face of the tank including the window thus forms part of a face of the housing in operation of the apparatus.

The procedure for moistening the flap of an envelope within the folder-inserter 100 will now be described. As described above, the folded collation sheets are inserted into the envelope within feedpath 25 at the stuffing station 27. The envelope is then transported by a driven roller 31*a* of roller pair 31, which is cooperating with a not shown driven roller mounted on the end of pivotable support arm 80, to pass the envelope over the moistener tank 70. The arm 80 pivots under the action of a cam (not shown), about a pivot point 81. Above the moistener tank 70, in particular above the openings 79 of the cover 78 in which the wicks 71 are accommodated, a deflector 85 is arranged to bring the flap of the envelope into contact with the wicks 71 when required to moisten adhesive therein. The deflector 85 pivots about a pivot point 82 and is moved downwards only at that time. Transport of an envelope etc. through this zone is assisted by a drive roller 88. A plurality of laterally-spaced lightly-sprung fingers 89 over which the envelope is transported serve to keep the envelope flap away from the wick and prevent it being moistened, except when the deflector is actuated. If an envelope is not moistened it will merely be closed rather than sealed at the subsequent sealing station. The deflector is solenoid-operated by the crease datum position detector (sensor) described hereinafter. By pivoting the deflector about its pivot point 82, it is moved downwards so that the flap is brought into contact along the wicks 71 for depositing liquid thereonto. Additionally, spring biased perforated elements can be arranged between the envelope and the wicks which are pressed down by the movement of the deflector 85 so that the wicks 71 are protected from excessive wear due to unnecessary contact of the wicks with the envelope.

Before the preferred embodiment of sealing an envelope is described with respect to FIGS. 7 and 10, a general concept for sealing the flap of an envelope to the body of an envelope will be explained, for a better understanding, with reference to FIGS. 12*a* to 12*f*, which schematically describe in a sequence how the flap can be sealed to the body of the envelope.

In FIG. 12*a* it is shown that a body 62 of the envelope is transported by a first roller pair 131 in a direction leading the envelope to the vicinity of a sealing roller pair 132 as shown by the corresponding arrows.

As can be seen from FIG. 12*b*, a buckle roller pair 133 is arranged downstream from the first roller pair 131 and the sealing roller pair 132, with an engageable roller 133*b* of the buckle roller pair 133 spaced apart from a fixed roller 133*a* of the buckle roller pair 133. The buckle roller pair 133 is in this position until a crease line 63 connecting the flap 61 with the body 62 of the envelope is substantially arranged underneath the sealing roller pair 132.

As indicated by FIG. 12*c*, the engageable roller 133*b* is brought into contact with the fixed roller 133*a* in response to a signal, when the crease line 63 of the envelope has been transported underneath the nip of sealing roller pair 132. Also, although not shown in FIGS. 12*a* to 12*f*, the engageable roller 133*b* is preferably arranged on an inducer which includes a protrusion that supports the movement of the crease line towards the nip of the sealing roller pair 132, when the engageable roller 133*b* is brought in contact with the fixed roller 133*a*, as will be described with reference to FIGS. 7 and 10.

FIG. 12*d* shows that the buckle roller pair 133 transports the envelope in a direction substantially opposite to the direction of the transporting roller pair 131 which is engaged with the flap 61 of the envelope. As a result of the movement of transport roller pair 131 and buckle roller pair 133, the crease line 63 of the envelope is inserted into the nip of sealing roller pair 132. Thereafter, the envelope is closed by pressing the flap 61 and the body 62 from opposite sides by sealing roller pair 132 as shown in FIG. 12*e*.

As further indicated by FIG. 12*f*, the whole envelope is transported by sealing roller pair 132 upwards to an output as shown by the corresponding arrows.

In an alternative embodiment of the concept for sealing the envelope, the buckle roller pair 133 can be replaced by a clamp (not shown) which holds the body 62 of the envelope by engaging clamp parts with the envelope from opposite sides while it is moved along in the transport direction, so that the envelope buckles. As a result, the crease line is inserted into the nip of the sealing roller pair 132 by transporting the envelope by means of transport roller pair 131. Thereafter, when the crease line is engaged with the sealing roller pair 132, the clamp will be released from the body of the envelope so that the flap can be sealed to the body of the envelope as shown in FIGS. 12*e* and 12*f*.

As will be apparent to a skilled person, the buckle roller pair can alternatively be driven significantly slower than the transport roller pair 131, whereby to insert the crease line into the nip of the sealing roller pair 132. Additionally, it is obvious that the flap of the envelope can be first transported through the transport roller pair 131, that is the envelope can be moved with the flap leading, rather than the body leading. Furthermore, and as is the case for the embodiment described hereinafter with reference to FIGS. 7 and 10, each roller of the sealing roller pair 132 can respectively serve as a roller of the transport roller pair 131 and the buckle roller pair 133, so that a minimum of four rollers is required for sealing the envelope, as will now be described.

A preferred embodiment for sealing the flap to the body of an envelope will now be described with reference to FIGS. 7 and 10. FIG. 10 shows the inducer 50 in a lowered, second position in which the inducer is not engaged with the envelope. The flap of the envelope on which liquid has been deposited from the moistener tank 70 has now to be closed and sealed to the body of the envelope. As described, the roller 31 a and a roller (not shown) at the end of the support arm 80 comprise first transport means which transport the envelope with the flap facing downwards at the trailing end of the envelope to the sealing station 30. The sealing station 30 comprises the inducer 50 and the sealing roller pair 31, including the drive roller 31*a* by which the envelope is transported to the sealing station 30. The inducer 50 of the sealing station 30, which can be formed as a one-piece component, has a curved transverse elongate guide portion 51 at one end of which and on one side of which a transverse protrusion 52 is located. On the other side of the portion 51 to the protrusion 52, the inducer 50 has a transverse rectangular portion 57 which extends away from the protrusion 52 and is substantially at a right angle at the protrusion 52, as viewed in side elevation. At the part of the rectangular portion 57 extending away from the protrusion 52, there is mounted a roller 53 which in a raised, first position of the inducer 50 is engaged with sealing roller 31*b*, as illustrated in FIG. 7 (engaged position). In FIG. 10, the inducer 50 is illustrated in the lowered, second position, in which the roller 53 is not engaged with the sealing roller 31*b*. Roller 53 and drive roller 31*b* comprise a second transport means (envelope buckling means) and rollers 31*a* and 31*b* comprise sealing means. FIG. 12*g* illustrates a four roller arrangement, using the reference numerals of FIGS. 7 and 10, in a schematic manner and analogous to FIGS. 12*c* to 12*d*, rather than the six roller arrangement shown therein. The roller which is not visible in FIGS. 7 and 10 is indicated as roller 83 in FIG. 12*g*.

The function and operation of the inducer 50 will now be described in more detail. After liquid has been added to the flap of the envelope from the moistener tank 70, the envelope with the envelope body leading is transferred to the sealing station 30. At that time the inducer 50 is in its lowered, second position (idle position) as shown in FIG. 10. The drive roller 31*a* and the roller (not shown) at the end of the support arm 80 transport the leading edge of the envelope body beyond the sealing roller pair 31 until the crease line of the envelope, which is the line that is formed between the flap and the body of the envelope, is located before or substantially over the protrusion 52 of the inducer 50. Then, the inducer is actuated by pivoting upwards around a fixed rotation axis 54 so that the crease line of the envelope is forced (pushed) towards and into the sealing nip of the sealing roller pair 31. The protrusion 52 thus supports the crease line, which is to be inserted into the nip of roller pair 31. In particular, drive roller 31*a*, which rotates in FIGS. 7 and 10 in counter-clockwise direction, engages with sealing roller 31*b*, so that sealing roller 31*b* rotates in FIGS. 7 and 10 in clockwise direction. Due to these rotation directions of sealing roller pair 31, the body of the envelope, which is urged upwards by the rotation of the sealing roller 31*b* and the roller 53 carried by the inducer 50, and the flap, which is urged upwards by the drive roller 31*a* and the roller (not shown) at the end of support arm 80 in a somewhat opposite direction to the envelope body, if the flap is still driven thereby, form a buckle. The tip of which is at the crease line of the envelope, which buckles upwards and thus forms the first part of the envelope that is inserted into the nip of sealing roller pair 31. In any event, the buckling at the crease line upwards is supported by curved portion 51 of the inducer 50 and the protrusion 52.

After the crease line of the envelope has been inserted in the nip of sealing roller pair 31, the envelope is moved further upwards by the sealing roller pair 31 so that the flap is closed and sealed against the body of the envelope. The closed envelope is directed upwards by the roller pair 31 to an ejection roller 87 and the envelope pivots roughly the order of a right angle around a turning axis 86 as it exits the interior of the folder inserter 100, so that it falls downwards onto the output station 90, landing with the envelope flat on the output tray 91.

If the inducer is in its raised, first position, the inducer 50 further acts as a diverter if only folded sheets are to be ejected out of the tabletop inserter and no envelope is required. For this purpose, the curved portion 51 corresponds substantially with the curvature of the drive roller 31*a*, and the protrusion 52 is substantially arranged underneath the nip of roller pair 31.

However, if the inducer 50 is used for sealing a flap to the envelope, the envelope starting with its leading edge begins to exit the folder inserter 100 at a casing opening 55 of housing structure 2, when the inducer 50 is in its lowered, second position. Subsequently, the crease line of the envelope is brought into contact with the sealing roller pair 31 by raising the inducer 50, and sealed, as described above, and the envelope directed upwards to turning point 86 and ejected out of the housing structure 2. The ejected envelopes are stored at output station 90. Since the crease line of the envelope is inserted between the two sealing rollers 31 due to the inducer movement upwards to the raised position, and even though the envelope may have begun to exit the housing structure 2 via opening 55 before the inducer 50 pivots around rotation axis 54 from the lowered to the raised position, it is not necessary to know the length of the envelope, since the crease line of the envelope is taken as the determining factor. Thus, envelopes with different sizes can be accommodated since they are sealed with reference to the position of the crease line, which can be detected as described further on. This sealing method, with or without the inducer can also be applied to envelopes fed with the flap leading, rather than trailing.

As already described, the closed envelopes exit the housing structure 2 of the folder inserter at an opening which is not specifically indicated in FIG. 11. The opening for ejecting the closed envelopes is underneath the plurality of ejection rollers 87 which are shown in FIG. 11.

The selective driving of the various rollers, in one or the other direction, or both, as well as the timing of the various operations is effected by a controller (not shown), which may for example be run under micro processor control.

For optimum functioning of the folder inserter 100, it is required that the envelope is appropriately positioned for the flapping, insertion, moistening and sealing operations, and in the case of moistening, that the deflector 85 is moved when the envelope flap is in the appropriate position, and in the case of the sealing operation that the inducer 50 is brought into its raised position at the appropriate time.

Referring now to FIG. 13, a sensor 93 which employs a photosensor 99, a light source (not shown) and means 94 for interrupting the optical path therebetween, in order to detect an envelope in the envelope feed path 42. The envelope feeder (26 in FIG. 1) has traction belt 41. Roller pair 43 serves to drive a fed envelope towards the insertion area 27 (stuffing station in FIG. 1), back around the path 98 to the flapper blade 44 and flapping chamber 47, and subsequently into the insertion area, as described above. The roller pair 43 is driven by a stepper motor (not shown). When an envelope 60 is fed by belt 41 along the envelope feed path and towards the insertion area (step 102 of FIG. 14), a pivotably mounted diverter 96 first detects its leading edge (step 103) and then detects its trailing edge (step 104), which for an unflapped envelope corresponds to the crease line. This is as a result of a flag 94 moving between the light source and the photosensor, since it moves with the diverter, and serving to interrupt or open the optical path therebetween, depending on the relative position of the flag and the sensor. The stepper motor is stopped when the trailing edge is detected (optical path interrupted again) and the position the trailing edge (crease line) adopts is set as a datum position (datum point or predetermined reference position) for the trailing edge (crease line) (step 105).

The length of the path between the datum position of the trailing edge (crease line) and the flapper blade 44 is a fixed distance (predetermined distance) and is the same for all envelope lengths. Hence the stepper motor will have to be driven (in the reverse direction) a fixed number of steps to position the trailing edge (crease line) of the envelope appropriately for the flapper blade, that is a predetermined reverse drive flapper count. The length of the path between the flapper blade 44 and the insertion area 27 is also a fixed distance and similarly means that the stepper motor will have to be driven (in the original direction) a respective fixed number of steps (a respective count) to the insertion area. Similarly, the distance the crease line of an envelope will have to be moved from the insertion area 27 to the sealing station 30 will be the same for all lengths of envelopes, and hence a respective stepper motor providing that movement will be stepped a respective fixed number of times, irrespective of the length of the envelope. Since the respective number of steps necessary to move the envelope to each area or station is fixed, correct coordination of the movement of other members at those areas or stations, such as the deflector 85 and the inducer 50 is facilitated. As indicated at step 106 of FIG. 14, embedded software can be provided to perform the steps to drive the step motor(s) for the predetermined fixed numbers of counts, and in the appropriate drive directions. The steps for a practical envelope movement process will include additional steps such as checking the envelope feed and sensor operation for errors, incorporating delays between the driving steps, and setting flags to indicate completed stages, thereby permitting related events to proceed. With reference to FIGS. 15*a* and 15*b*, which together comprise a single flow chart, a specific embodiment of a program for envelope feeding, flapping and preparing for insertion will now be described. The reference numerals used in FIG. 13 for the envelope feeder (41), the sensor (93) and the roller drive (43) have also been used in FIGS. 15*a* and 15*b*.

The routine starts with driving the feeder 41 and the roller pair 43 (step 150). A query is made 151 regarding whether or not the sensor has been made, namely has the sensor detected the presence of an envelope, if not a sequence 154–158 determines if the envelope has been driven for long enough, if there is an error or attempts a restart of feeder 41. If the sensor has detected an envelope a flag is set 152 which can be used for other purposes, and the feeder 41 driven 153 for the appropriate time so that the sensor can detect the trailing edge of the envelope, namely the crease line, at 159. Failure to detect at this stage can result in an error message and includes checking that the envelope was driven for long enough 160. If the sensor is clear the roller drive 43 is driven for a predetermined time corresponding to a clearance count 161, is stopped 162, reversed 163, the reverse state indicated, and the envelope driven in the reverse direction (up the flapper path) for a predetermined time 164 and after a short delay 165, driven forward 166 a predetermined time so that the envelope is flapped and driven to the insertion point in one step. A flag is set 167 to indicate the envelope has been flapped and this flag can be used for other purposes i.e. to start other processes. A query is raised at 168 regarding the completion of the insertion counts and roller pair 43 is stopped 196, an envelope complete flag set 170, which indicates that the envelope is in the stuffing (inserting) position, fingers for throating the envelope are driven 171, and the drive for roller pair 43 reversed for a predetermined time to pull the envelope back onto the fingers 172.

As will be appreciated, all distances to be traversed are measured from a datum point corresponding to the position of the trailing edge (crease line) of the envelope at a particular point in the process and thus are independent of the length of the envelope. The same amount of movement, provided by a roller or other drive means, will be needed to move an envelope of any length of envelope between one particular operation area and the next. Whereas in the above description the process involves stopping the envelope when its trailing edge is detected and the datum point set, stopping is not necessary and the sensor position can be defined as the datum position and the distance to the next operation station measured from it. Whereas the above description specifically refers to a process involving the movement of envelopes of various lengths, it will be appreciated that the same principle, that is sensing the trailing edge of any elongate element, or article with leading and trailing edges, can be used in a corresponding multi-operation process which can accommodate elongate elements of various lengths. Indeed, the same principle can be applied to the detection of leading edges and movement of the leading edges of articles by predetermined amounts between operation stations. Further, rather than using a stop in the folding process as described above, a trailing edge detection and controlled subsequent movement arrangement could be employed.

It is to be understood that the use of the collation rollers represent one particular preferred way of aligning the sheets of the collation. However, other ways of achieving this result are also contemplated, such as movable stops.

It will be appreciated that the described collation apparatus is of simple construction, requires minimal operator effort to reload the sheet feeder and is able to assemble any number of sheets to form each collation, without needing a corresponding number of sheet feeders.

Furthermore, the layout of the principal internal components of the inserter results in an extremely compact and ergonomic arrangement, especially due to the design of the collation apparatus with only a single feeding tray, the space-saving design of the folding station with its crossing sheet paths, and the way in which the feed and transfer paths from the sheet feeder and accumulation station, respectively, reorientate the sheets from approximately horizontal to substantially vertical, which largely determines or at least restricts the positions of the first and second folders and feed tray to be desirably configured from an accessibility standpoint whilst maintaining a compact layout.

It will be appreciated that the described sheet folding apparatus is of simple and compact construction, locates its folders in convenient positions for access, employs generally straight paths for the passage of the sheet collation and relies on the folding rollers of the sheet folders to achieve the required re-orientations of the collation. Positioning the sheet folders in upper and rear sections of the inserter housing avoids the need to provide access to them from the front of the inserter, where the control panel and operator interface are necessarily provided.

Although the described sheet folding apparatus serves to double-fold (C-fold) a sheet collation comprising a plurality of sheets, it will be appreciated that it could be used instead to double-fold a single sheet.

In known manner, (i.e. by adjusting the settings of the first and second sheet folders), it is possible to adjust the type of fold, such as Z-fold or double fold (i.e. fold in half and in half again). It is possible to fold the sheet or sheet collation only once.

As will be appreciated the design of the moistener involves a one piece moistener tank, which is a low-cost component, which readily allows the user to see when liquid needs to be added due to the window, which is easily removable for cleaning purposes, for replacement of the wicks or the whole tank structure, and which is easily partially removed for the addition of liquid.

The apparatus for sealing envelopes is low cost and able to accommodate envelopes of various sizes, since it is the position of the creaseline which determines (controls) the operation. Excessively long envelopes do not require the apparatus to be extended in length, rather they can emerge through the opening 55 temporarily prior to the actual sealing, if fed with the body at the leading edge. The use of one roller from each of the two transport means to form the sealing roller pair also reduces the cost and the space required in comparison with use of a separate sealing pair.

What is claimed is:

1. A process for performing a plurality of operations on an envelope having a flap and a body with a crease line therebetween, which operations are performed at respective spaced-apart locations and are associated with the crease line, comprising the steps of (a) feeding the envelope unflapped, with the crease line trailing, towards a first said location;

(b) sensing the passage of the envelope towards the first said location and stopping the envelope when the crease line has been sensed, the stopped position of the crease line comprising a datum position therefor;

(c) moving the envelope by respective drive means such that the crease line is disposed at a second location and at a respective distance from the datum position and performing a respective operations on the envelope;

(d) moving the envelope by respective drive means such that the crease line is disposed at a third location and at a respective distance from the datum position and performing a respective operation on the envelope, and so on until the plurality of operations has been performed;

and wherein for movement of any envelope between two successive locations, and irrespective of the length of the elongate element, the respective drive means is actuated identically for moving the envelope a predetermined distance with respect to each said respective drive means.

2. A process as claimed in claim 1, wherein at one said location the respective operation comprises flapping the envelope.

3. A process as claimed in claim 2, wherein at the next said location to which the envelope is moved the respective operation is an insertion operation.

4. A process as claimed in claim 3, wherein the envelope is subsequently moistened and including the step of urging the envelope towards a moistening element when the crease line is in a predetermined position whereby to moisten a predetermined part of the envelope.

5. A process as claimed in claim 4, wherein the envelope is subsequently sealed, including the step of causing buckling of the envelope when the crease line is in a predetermined position and urging the crease line into a sealing means.

6. A process as claimed in claim 5, and including the step of actuating an inducer facilitating said buckling when the crease line is in the predetermined position.

* * * * *